US011770238B2

(12) United States Patent
Shirley et al.

(10) Patent No.: US 11,770,238 B2
(45) Date of Patent: *Sep. 26, 2023

(54) DECENTRALIZED COMPUTATION SYSTEM ARCHITECTURE BASED ON NODE SPECIALIZATION

(71) Applicant: Dapper Labs Inc., Vancouver (CA)

(72) Inventors: Dietrich Theodore Shirley, Vancouver (CA); Fabiano Pereira Soriani, Vancouver (CA); Christopher Patrick Scott, Vancouver (CA); Layne Lafrance, Vancouver (CA)

(73) Assignee: Dapper Labs, Inc., Vancouver (CA)

( * ) Notice: Subject to any disclaimer, the term of this patent is extended or adjusted under 35 U.S.C. 154(b) by 117 days.

This patent is subject to a terminal disclaimer.

(21) Appl. No.: 17/493,152

(22) Filed: Oct. 4, 2021

(65) Prior Publication Data

US 2022/0029786 A1 Jan. 27, 2022

Related U.S. Application Data

(63) Continuation of application No. 16/421,222, filed on May 23, 2019, now Pat. No. 11,139,956.

(Continued)

(51) Int. Cl.
*H04L 29/06* (2006.01)
*H04L 9/06* (2006.01)
(Continued)

(52) U.S. Cl.
CPC ....... *H04L 9/0637* (2013.01); *G06Q 20/3827* (2013.01); *H04L 9/0643* (2013.01); *H04L 9/3255* (2013.01)

(58) Field of Classification Search
CPC .. G06F 21/62; G06F 21/6209; G06F 21/6218; G06F 21/6227; G06F 21/64; G06F 16/1824; G06F 21/44; G06F 21/629; G06F 16/2379; G06F 16/9027; H04L 9/0643; H04L 9/30; H04L 2209/38; H04L 9/0637; H04L 9/0618; H04L 9/3247;
(Continued)

(56) References Cited

U.S. PATENT DOCUMENTS 10,616,324 B1 4/2020 Kaddoura
10,785,035 B1 9/2020 Lv
(Continued)

FOREIGN PATENT DOCUMENTS

WO WO-2022236406 A1 11/2022

OTHER PUBLICATIONS

"Flow Primer—Flow: Blockchain for Open Worlds", Flow, online at <URL: www.onflow.org/primer>, 2020, 15 pages.
(Continued)

*Primary Examiner* — Malcolm Cribbs
(74) *Attorney, Agent, or Firm* — Schwegman Lundberg & Woessner, P.A.

(57) ABSTRACT

Described are systems, methods, and media for providing secure and scalable decentralized computation for one or more decentralized applications. Features include a blockchain; and a plurality of nodes comprising a plurality of each of three specialized node types, the specialized node types comprising access nodes, security nodes, and execution nodes.

22 Claims, 6 Drawing Sheets

Related U.S. Application Data

(60) Provisional application No. 62/676,131, filed on May 24, 2018.

(51) Int. Cl.
  *G06Q 20/38* (2012.01)
  *H04L 9/32* (2006.01)

(58) Field of Classification Search
  CPC . H04L 9/3239; H04L 9/3263; H04L 2209/56; H04L 9/0656; H04L 9/3255; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
  See application file for complete search history.

(56) References Cited

U.S. PATENT DOCUMENTS

| | | | |
|---|---|---|---|
| 11,139,956 | B2 | 10/2021 | Shirley et al. |
| 11,184,437 | B2 | 11/2021 | Shirley et al. |
| 2016/0292672 | A1 | 10/2016 | Fay |
| 2017/0048234 | A1 | 2/2017 | Lohe et al. |
| 2017/0116693 | A1 | 4/2017 | Rae |
| 2017/0177898 | A1 | 6/2017 | Dillenberger |
| 2017/0236123 | A1 | 8/2017 | Ali et al. |
| 2017/0317833 | A1 | 11/2017 | Smith et al. |
| 2018/0204213 | A1 | 7/2018 | Zappier |
| 2019/0026146 | A1 | 1/2019 | Peffers |
| 2019/0160660 | A1* | 5/2019 | Husain .............. B25J 9/1674 |
| 2019/0236559 | A1 | 8/2019 | Padmanabhan |
| 2019/0280880 | A1 | 9/2019 | Zhang et al. |
| 2019/0287099 | A1 | 9/2019 | Tan |
| 2019/0303579 | A1* | 10/2019 | Reddy ................ H04L 9/50 |
| 2019/0303942 | A1 | 10/2019 | Balaraman |
| 2019/0349733 | A1 | 11/2019 | Nolan |
| 2019/0363874 | A1 | 11/2019 | Shirley et al. |
| 2020/0192873 | A1 | 6/2020 | Chang |
| 2020/0313903 | A1 | 10/2020 | Yu |
| 2021/0273993 | A1 | 9/2021 | Shirley et al. |
| 2021/0336769 | A1 | 10/2021 | Shirley et al. |
| 2022/0159069 | A1 | 5/2022 | Shirley et al. |

OTHER PUBLICATIONS

"Flow Token Economics." Flow, online at <URL: www.onflow.org/flow-token-economics>, 2020, 15 pages.

Hentschel, Dr. Alexander, et al., "Flow: Separating Consensus and Compute", Sep. 12, 2019 (Year: 2019), ArXiv abs/1909.05821v1, 21 pages.

Hentschel, Dr. Alexander, et al., "Flow: Separating Consensus and Compute—Block Formation and Execution-", Feb. 18, 2020 (Year: 2020), ArXiv abs/2002.07403v1, 41 pages.

Hentschel, Dr. Alexander, et al., "Flow: Separating Consensus and Compute—Execution Verification-", Sep. 12, 2019 (Year: 2019), ArXiv abs/1909.05832v1, 35 pages.

"U.S. Appl. No. 16/421,222, Notice of Allowance dated Aug. 13, 2021", 7 pgs.

"U.S. Appl. No. 16/421,222, Non Final Office Action dated Jun. 24, 2021", 9 pgs.

"U.S. Appl. No. 16/421,222, Response filed Jul. 6, 2021 to Non Final Office Action dated Jun. 24, 2021", 7 pgs.

"U.S. Appl. No. 16/421,222, 312 Amendment filed Aug. 18, 2021", 7 pgs.

"U.S. Appl. No. 16/421,222, PTO Response to Rule 312 Communication dated Aug. 31, 2021", 2 pgs.

"U.S. Appl. No. 16/421,222, Notice of Allowability dated Sep. 8, 2021", 2 pgs.

"U.S. Appl. No. 17/321,239, Preliminary Amendment filed May 20, 2021", 4 pgs.

"U.S. Appl. No. 17 321,239, Non Final Office Action dated Aug. 27, 2021", 12 pgs.

"U.S. Appl. No. 17/321,239, Response filed Sep. 7, 2021 to Non Final Office Action dated Aug. 27, 2021", 9 pgs.

"U.S. Appl. No. 17/321,239, Notice of Allowance dated Sep. 16, 2021", 8 pgs.

"U.S. Appl. No. 17 532,425, Preliminary Amendment filed Feb. 7, 2022", 7 pgs.

"International Application Serial No. PCT CA2022 050732, International Search Report dated Aug. 2, 2022", 7 pgs.

"International Application Serial No. PCT CA2022 050732, Written Opinion dated Aug. 2, 2022", 4 pgs.

U.S. Appl. No. 17/370,019, Non Final Office Action dated Mar. 3, 2023, 5 pgs.

U.S. Appl. No. 17/532,425, Non Final Office Action dated Apr. 27, 2023, 14 pgs.

\* cited by examiner

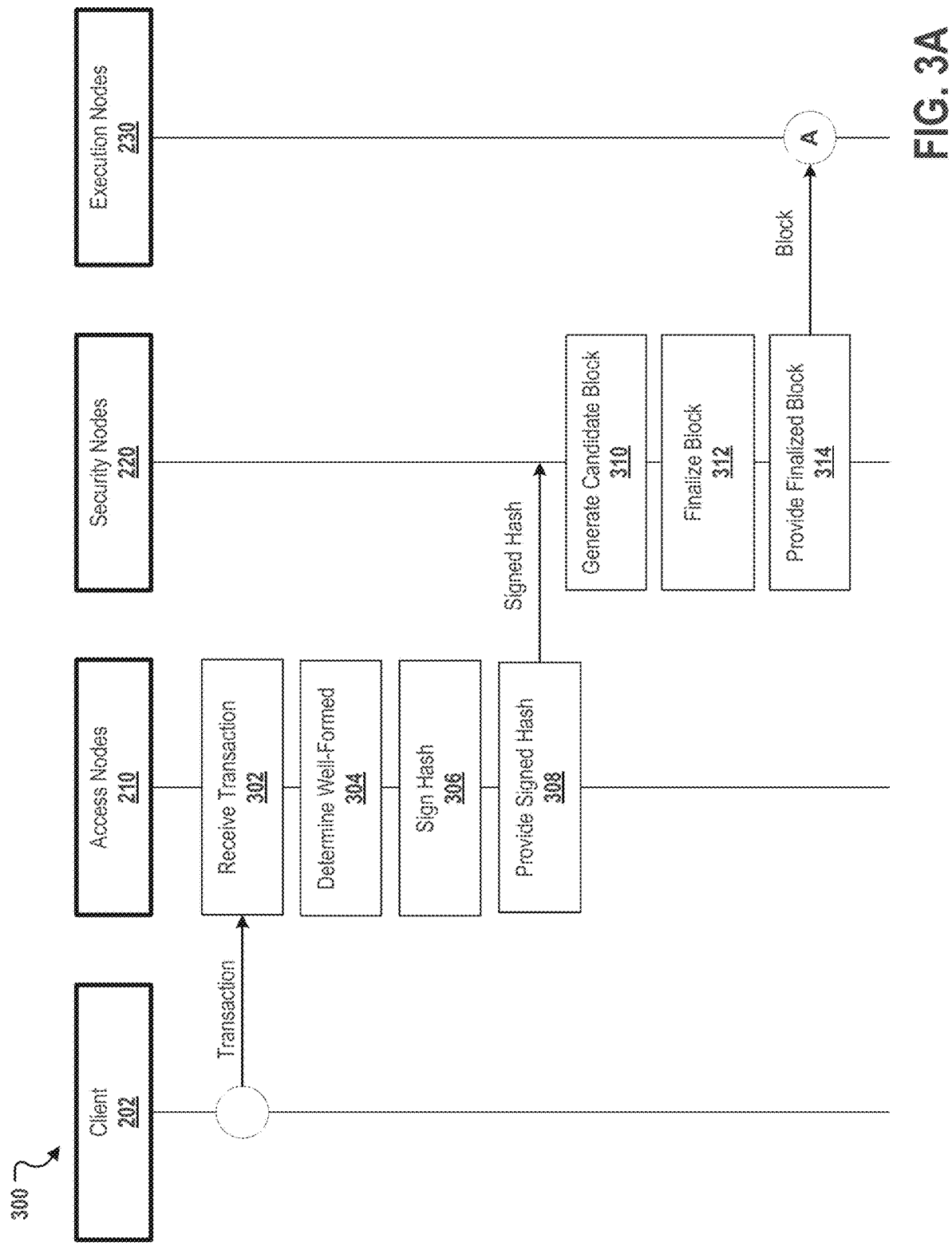

DECENTRALIZED COMPUTATION SYSTEM ARCHITECTURE BASED ON NODE SPECIALIZATION

CROSS-REFERENCE TO RELATED APPLICATIONS

This application is a continuation of U.S. patent application Ser. No. 16/421,222, filed May 23, 2019, entitled "DECENTRALIZED COMPUTATION SYSTEM ARCHITECTURE BASED ON NODE SPECIALIZATION", which claims the benefit of U.S. Provisional Application Ser. No. 62/676,131, filed May 24, 2018, the entire contents of which are hereby incorporated by reference in their entirety.

BACKGROUND

A distributed ledger can be described as a ledger of any transactions or contracts maintained in decentralized form across different locations and people, eliminating the need of a central authority to keep a check against manipulation. All the information on it is securely and accurately stored using cryptography and can be accessed using keys and cryptographic signatures. Once the information is stored, it becomes an immutable database, which the rules of the network govern. Distributed ledgers are inherently harder to attack than, for example, a centralized ledger because all the distributed copies need to be attacked simultaneously for an attack to be successful. Moreover, these records are resistant to malicious changes by a single party.

SUMMARY OF THE INVENTION

Antifragility is a commitment to relentlessly iterating a system until it satisfies a set of requirements. Moreover, lean product development methods and fast iteration cycles create products that serve user needs in record time. To that end, evolving software to address the various needs and problems uncovered in early development phases is critical. As such, a development team must react quickly to insights gleaned during this stage and complete any improvements needed as efficiently as possible. Overtime, the system will grow and mature, and, as a result, development shifts will happen more slowly to accommodate a growing user base. But it is critical to start with a small system that works for its initial users so a more complex system can, eventually, grow out of it.

Gall's law states: "a complex system that works is invariably found to have evolved from a simple system that worked. A complex system designed from scratch never works and cannot be patched up to make it work. You have to start over with a working simple system." This observation provides a framework under which large, complex, and interconnected system are designed. Reliability and resiliency for the ecosystem are the result of continuous improvement, not an unrealistic goal to get it right on day one.

Efficiency is a multi-faceted pillar that addresses two substantial problems observed in the blockchain space. The first is Proof of Work (PoW), which is consistently criticized for its excessive use of power and inefficient resource allocation. We reject PoW as an option for securing a system. The second issue is the significant amount of duplicate effort a blockchain requires to operate, even in a Proof of Stake (PoS) based system which still requires all the nodes to hold all the state even though they are not solving a PoW problem. In a traditional blockchain, for example, each node must perform every task associated with block production. This duplication is not only a chokepoint for scale, it is a poor allocation of resources that would be better served if applied to their respective strengths.

Moreover, one of the compelling use-case of blockchain technology is the ability to create permissionless and autonomous software systems. Moreover, the long-run value of an ecosystem of autonomous, interoperable software may indeed stand as the most compelling outcome of the decentralized revolution. The overwhelming majority of existing proposals for open, consumer-scale blockchain systems depend on some kind of sharding. While the various approaches to sharding legitimately increase the number of transactions the network is able to handle, they severely limit the capability of those transactions. In particular, each transaction is only able to read and modify information within its own shard. In some sharded blockchain implementations, communication with other shards must occur asynchronously and—without expensive and complicated locking operations—runs the risk of acting on stale information. Moreover, existing proposal for a sharded blockchain do not provide the ability for a single atomic transaction to interact with multiple shards. For example, a separate transaction must be issued on each shard, and if atomicity guarantees are required (for example, if there is some reciprocal exchange of value), there must be some kind of complex locking and commitment system built on top of the blockchain.

In some embodiments, the described decentralized computation system provides an architectural approach with high throughput and no-sharding, which results in composability. In some embodiments, such composability provides for complex new trustless systems to be created through a novel combination of simpler trustless systems. The described decentralized computation system can be employed to, for example, support decentralized applications. In some embodiments, the described decentralized computation system divides a peer-to-peer network into three distinct node types, each responsible for one of three critical tasks: accessing the network from outside, securing the network from attacks, and computing the state of the network. Such separation of concerns enables node specialization, which dramatically improves the throughput of the network while enhancing the security and decentralization possibilities of the deployed system. Additionally, composability is a powerful manifestation of software reuse, but composability without atomicity can lead to inconsistent results (e.g., "weird states"). As such, the described decentralized computation system employs a scaling mechanism that allows each transaction the ability to atomically access and modify any part of the canonical state with which it is authorized to interact.

In one aspect, disclosed herein is a decentralized computation system for providing secure and scalable decentralized computation for one or more decentralized applications comprises: a blockchain; and a plurality of nodes comprising a plurality of each of three specialized node types, the specialized node types comprising access nodes, security nodes, and execution nodes; the access nodes configured to perform at least: receiving one or more transactions from at least one client, the one or more transactions each comprising transaction text and credentials; cryptographically signing a hash for each of the transaction text of the one or more transactions based on a determination that the one or more transactions are well-formed; providing the one or more signed hashes to the security node for validation; and providing a state response to the at least one client, the state response determined based on an output for a block; the security nodes configured to perform at least: generating a candidate block comprising the one or more signed hashes; finalizing the candidate block by performing a Byzantine fault tolerance (BFT) consensus algorithm to validate that a threshold number of access nodes determined that the one or more transactions were well-formed based on the one or more signed hashes; and providing the finalized block to the execution nodes; and the execution nodes configured to perform at least: receiving, from the access nodes, the transaction text for each of the one or more transactions based on a query provided to the access nodes, the query determined according to the block; presenting a hashed commitment of the output for the block to the other execution nodes, the output for the block determined based on the transaction text for each of the one or more transactions; and revealing the output to the access nodes when each of the other execution nodes has presented the output for the block. In some embodiments, the security nodes comprise more nodes than the access nodes and the access nodes comprise more nodes than the execution nodes. In some embodiments, each of the execution nodes has more computational power than each of the access nodes and each of the access nodes has more computational power than each of the security nodes. In some embodiments, the access nodes are configured to perform at least: providing the one or more signed hashes to the security nodes when a consensus is reached by the access nodes that the one or more transactions are well-formed. In some embodiments, the transaction texts for each of the one or more transactions are persisted by the access nodes until the execution nodes provide the hashed commitment of the output for the finalized block. In some embodiments, the access nodes are configured to perform at least: providing the transaction text for each of the one or more transactions when queried by the execution nodes. In some embodiments, the access nodes are configured to perform at least: receiving the hashed commitment of the output for the finalized block from the execution nodes; and providing a query verifying the output for the finalized block to a set of the execution nodes. In some embodiments, the execution nodes are configured to perform at least: providing the output for the finalized block to the access nodes in response to receiving the query verifying the output for the finalized block. In some embodiments, the access nodes are configured to perform at least: storing a cache of the output for the finalized block; and providing, to the client, results of computations for the one or more transactions based on the output for the finalized block. In some embodiments, the credentials are for a guarantor of the one or more transactions. In some embodiments, the access nodes are configured to determine that the one or more transactions are well-formed by checking the credentials of the one or more transactions. In some embodiments, the one or more signed hashes indicate that the respective one or more transactions are well-formed and that the respective one or more transaction texts will be persisted until the execution nodes have finished processing the one or more transactions. In some embodiments, the execution nodes store an entire canonical state of the blockchain. In some embodiments, only the execution nodes store the entire canonical state of the blockchain. In some embodiments, the access nodes are slashed if they provide a transaction that is ill-formed or if they fail to store the transaction text of the one or more transactions. In some embodiments, the security nodes are slashed if they finalize an invalid block. In some embodiments, the system provides the decentralized computation for the one or more decentralized applications without sharding or dividing a network into two or more subunits that interact asynchronously. In some embodiments, the system provides the decentralized computation for, more than 10, more than 100, or more than 1000 decentralized applications. In some embodiments, the decentralized computation for the one or more decentralized applications comprises more than 1000 transactions-per-second (tps), more than 50,000 tps, or more than 100,000 tps. In some embodiments, the BFT consensus algorithm comprises a variant of Casper correct-by-construction (CBC) or Tendermint-derived scalable BFT (SBFT), Hot Stuff, or Fantomette. In some embodiments, the access nodes are configured to perform at least: bundling the one or more signed hashes into a collection, wherein the one or more signed hashes are provided to the security node for validation as the collection. In some embodiments, the security nodes are configured to perform at least: gathering the collection and other collections, provided by access nodes to generate the block. In some embodiments, the candidate block is generated by a group of the security nodes, the group determined according to the BFT consensus algorithm. In some embodiments, the group comprises a subset of the security nodes. In some embodiments, the group comprises all of the security nodes. In some embodiments, the finalized block determines an order of transactions.

In another aspect, a decentralized computation system for adding a block to a blockchain comprises: access nodes configured to receive, from a client, one or more transactions, determine that the one or more transactions are well-formed, and provide responses to queries related to a canonical state for the blockchain; security nodes configured to provide a guarantee for the block through a BFT consensus algorithm employed to finalize the one or more transactions; and execution nodes configured to determine a result for each of the one or more transactions, once finalized, and store the canonical state of the blockchain. In some embodiments, the one or more transactions each comprise transaction text and credentials. In some embodiments, the credentials are for a guarantor of the one or more transactions. In some embodiments, the access nodes are configured persist the transaction text for each of the one or more transactions until the execution nodes present a hashed commitment of the output for the block. In some embodiments, the access nodes are configured to provide the transaction text for each of the one or more transactions when queried by the execution nodes. In some embodiments, the access nodes are configured to cryptographically sign a hash for each of the transaction texts based on a determination that the one or more transactions are well-formed, and wherein the block comprises the one or more signed hashes. In some embodiments, the access nodes determine that the one or more transactions are well-formed by checking the credentials of the one or more transactions. In some embodiments, the one or more signed hashes of the transaction text of the one or more transactions indicate that the respective one or more transactions are well-formed and that the respective one or more transaction texts will be persisted until the execution nodes have finished processing the one or more transactions. In some embodiments, the access nodes are configured to provide the one or more signed hashes to the security nodes when a consensus is reached by the access nodes that the one or more transactions are well-formed. In some embodiments, the access nodes are configured to bundle the one or more signed hashes into a collection, wherein the one or more signed hashes are provided to the security nodes for validation as the collection. In some embodiments, the access nodes are configured to bundle the one or more signed hashes into a collection, wherein the one or more signed hashes are provided to the security nodes for validation as the collection. In some embodiments, the security nodes are configured to provide the guarantee for the block by performing the BFT consensus algorithm to validate a threshold number of access nodes determined that the one or more transactions were well-formed based on the one or more signed hashes. In some embodiments, the block is generated by a group of the security nodes, the group determined according to the BFT consensus algorithm. In some embodiments, the group comprises a subset of the security nodes. In some embodiments, the group comprises all of the security nodes. In some embodiments, the security nodes are configured, when a member of the group, to: gather the collection and other collections, provided by the access nodes, and generate the block. In some embodiments, the execution nodes are configured to determine a result for each of the one or more transactions by receiving, from the access nodes, the transaction text for each of the one or more transactions based on a query provided to the access nodes, the query determined according to the finalized block. In some embodiments, the execution nodes are configured to: determine an output for the finalized block based on the transaction text for each of the one or more transactions; present a hashed commitment of the output for the finalized block to the other execution nodes; reveal the output for the finalized block to the access nodes when each of the other execution nodes has presented the output for the finalized block. In some embodiments, the access nodes are configured to provide a state response to the client, the state response determined based on the output for the finalized block. In some embodiments, the security nodes comprise more nodes than the access nodes and the access nodes comprise more nodes than the execution nodes. In some embodiments, each of the execution nodes has more computational power than each of the access nodes and each of the access nodes has more computational power than each of the security nodes. In some embodiments, the access nodes are configured to: receive a hashed commitment of an output for the block; and provide a query verifying the output for the block to a set of the execution nodes. In some embodiments, the execution nodes are configured to provide the output for the block to the access nodes in response to receiving the query verifying the output for the block. In some embodiments, the access nodes are configured to: store a cache of an output for the block; and provide, to the client, results of computations for the one or more transactions based on the output for the block. In some embodiments, the execution nodes store an entire canonical state of the blockchain. In some embodiments, only the execution nodes store the entire canonical state of the blockchain. In some embodiments, the access nodes are slashed if they provide a signed hash for a transaction that is ill-formed or if they fail to store a transactions text of the one or more transactions. In some embodiments, the security nodes are slashed if they finalize an invalid block. In some embodiments, the system is configured to provide secure and scalable decentralized computation for one or more decentralized applications. In some embodiments, the system provides the decentralized computation for the one or more decentralized applications without sharding or dividing a network into two or more subunits that interact asynchronously. In some embodiments, the decentralized computation for the one or more decentralized applications comprises more than 1000 tps, more than 50,000 tps, or more than 100,000 tps. In some embodiments, the system is configured to provide decentralized computation for, more than 10, more than 100, or more than 1000 decentralized applications. In some embodiments, the BFT consensus algorithm comprises a variant of CBC, Tendermint-derived SBFT, Hot Stuff, or Fantomette. In some embodiments, the block determines an order of the transactions.

In another aspect, disclosed herein is a computer-implemented method of adding a block to a blockchain comprises: receiving, through a plurality of access nodes, one or more transactions from a client; determine, through the access nodes, that the one or more transactions are well-formed; providing, through a plurality of security nodes, a guarantee for the block through a Byzantine fault tolerance (BFT) consensus algorithm employed to finalize the block; determining, through a plurality execution nodes, a result for each of the one or more transactions, once the block is finalized; storing, through the execution nodes, a canonical state of the blockchain; and providing, through the access nodes, responses to queries related the canonical state for the blockchain. In some embodiments, the one or more transactions each comprise transaction text and credentials. In some embodiments, the credentials are for a guarantor of the one or more transactions. In some embodiments, the method comprises: persisting, through the access nodes, the transaction text for each of the one or more transactions until the execution nodes present a hashed commitment of the output of the block. In some embodiments, the method comprises: providing, through the access nodes, the transaction text for each of the one or more transactions when queried by the execution nodes. In some embodiments, the method comprises: cryptographically signing, through the access nodes, a hash for each of the transaction text based on a determination that the one or more transactions are well-formed; and providing, through the access nodes, the one or more signed hashes to the security nodes for validation. In some embodiments, the method comprises: checking, through the access nodes, the credentials of the one or more transactions to determine that the one or more transactions are well-formed. In some embodiments, the one or more signed hashes indicate that the respective one or more transactions are well-formed and that the respective one or more transaction texts will be persisted until the execution nodes have finished processing the one or more transactions. In some embodiments, the method comprises: providing, through the access nodes, the one or more signed hashes to the security nodes when a consensus is reached by the access nodes that the one or more transactions are well-formed. In some embodiments, the method comprises: bundling, through the access nodes, the one or more signed hashes into a collection, wherein the one or more signed hashes are provided to the security nodes for validation as the collection. In some embodiments, the method comprises: providing, through the security nodes, the guarantee for the block by performing the BFT consensus algorithm to: validate a threshold number of access nodes determined that the one or more transactions were well-formed based on the one or more signed hashes, and finalize the block. In some embodiments, the method comprises: generating, with a group of the security nodes, the block as a candidate block, the group determined according to the BFT consensus algorithm. In some embodiments, the group comprises a subset of the security nodes. In some embodiments, the group comprises all of the security nodes. In some embodiments, the candidate block is generated by gathering, through the group of security nodes, the collection and other collections, provided by the access nodes. In some embodiments, the method comprises: determining, through the execution nodes, a query according to the finalized block; determining, through the access nodes, the transaction text for each of the one or more transactions based on the query; and determining, through the execution nodes, a result for each of the one or more transactions based on the transaction text for each of the one or more transactions. In some embodiments, the method comprises: determining, through the execution nodes, an output for the finalized block based on the transaction text for each of the one or more transactions; presenting, through the execution nodes, a hashed commitment of the output for the finalized block to the other execution nodes; and revealing, through the execution nodes, the output for the finalized block to the access nodes when each of the other execution nodes have presented of the output for the finalized block. In some embodiments, the method comprises: providing, through the access nodes, a state response to the client, the state response determined based on the output for the finalized block. In some embodiments, the method comprises: persisting, through the access nodes, the transaction text for each of the one or more transactions until the execution nodes present the hashed commitment of the output of the finalized block. In some embodiments, the method comprises: providing, through the access nodes, the transaction text for each of the one or more transactions when queried by the execution nodes. In some embodiments, the security nodes comprise more nodes than the access nodes and the access nodes comprise more nodes than the execution nodes. In some embodiments, each of the execution nodes has more computational power than each of the access nodes and each of the access nodes has more computational power than each of the security nodes. In some embodiments, the method comprises: receiving, through the access nodes, a hashed commitment of an output for the block from the execution nodes; and providing, through the access nodes, a query verifying the output for the block to a set of the execution nodes. In some embodiments, the method comprises: providing, through the execution nodes, the output for the block in response to receiving the query verifying the output for the block. In some embodiments, the method comprises: storing, through the access nodes, a cache of an output for the block; and providing, to the client through the access nodes, results of computations for the one or more transactions based on the output for the block. In some embodiments, the method comprises: storing, through the execution nodes, an entire canonical state of the blockchain. In some embodiments, the method comprises: storing, through only the execution nodes, the entire canonical state of the blockchain. In some embodiments, the method comprises: slashing the access nodes if they provide a signed hash for a transaction that is ill-formed or if they fail to store a transactions text of the one or more transactions. In some embodiments, the method comprises: slashing the security nodes if they finalize an invalid block. In some embodiments, the method comprises: providing secure and scalable decentralized computation for one or more decentralized applications. In some embodiments, the method comprises: providing the decentralized computation for the one or more decentralized applications without sharding or dividing a network into two or more subunits that interact asynchronously. In some embodiments, the decentralized computation for the one or more decentralized applications comprises more than 1000 transactions-per-second (tps), more than 50,000 tps, or more than 100,000 tps. In some embodiments, the method comprises: providing decentralized computation for, more than 10, more than 100, or more than 1000 decentralized applications. In some embodiments, the BFT consensus algorithm comprises a variant of Casper correct-by-construction (CBC), Tendermint-derived scalable BFT (SBFT), Hot Stuff, or Fantomette. In some embodiments, the finalized block determines an order of the transactions.

In another aspect, disclosed herein are one or more non-transitory computer-readable storage media coupled to one or more processors and having instructions stored thereon which, when executed by the one or more processors, cause the one or more processors to perform operations to provide a secure and scalable decentralized computation for one or more decentralized applications through a plurality of nodes comprising a plurality of each of three specialized node types, the specialized node types comprising access nodes, security nodes, and execution nodes, the operations comprising: receiving, through a plurality of access nodes, one or more transactions from a client; determine, through the access nodes, that the one or more transactions are well-formed; providing, through a plurality of security nodes, a guarantee for the block through a BFT consensus algorithm employed to finalize block; determining, through a plurality execution nodes, a result for each of the one or more transactions, once the block is finalized; storing, through the execution nodes, a canonical state of a blockchain; and providing, through the access nodes, responses to queries related the canonical state for the blockchain. In some embodiments, the one or more transactions each comprise transaction text and credentials. In some embodiments, the credentials are for a guarantor of the one or more transactions. In some embodiments, the operations comprise: persisting, through the access nodes, the transaction text for each of the one or more transactions until the execution nodes present a hashed commitment of the output of the block. In some embodiments, the operations comprise: providing, through the access nodes, the transaction text for each of the one or more transactions when queried by the execution nodes. In some embodiments, the operations a decentralized computation system for providing secure and scalable decentralized computation for one or more decentralized applications comprises: a blockchain; and a plurality of nodes comprising a plurality of each of three specialized node types, the specialized node types comprising access nodes, security nodes, and execution nodes; the access nodes configured to perform at least: receiving one or more transactions from at least one client, the one or more transactions each comprising transaction text and credentials; cryptographically signing a hash for each of the transaction text of the one or more transactions based on a determination that the one or more transactions are well-formed; providing the one or more signed hashes to the security node for validation; and providing a state response to the at least one client, the state response determined based on an output for a block; the security nodes configured to perform at least: generating a candidate block comprising the one or more signed hashes; finalizing the candidate block by performing a Byzantine fault tolerance (BFT) consensus algorithm to validate that a threshold number of access nodes determined that the one or more transactions were well-formed based on the one or more signed hashes; and providing the finalized block to the execution nodes; and the execution nodes configured to perform at least: receiving, from the access nodes, the transaction text for each of the one or more transactions based on a query provided to the access nodes, the query determined according to the block; presenting a hashed commitment of the output for the block to the other execution nodes, the output for the block determined based on the transaction text for each of the one or more transactions; and revealing the output to the access nodes when each of the other execution nodes has presented the output for the block:

cryptographically signing, through the access nodes, a hash for each of the transaction text based on a determination that the one or more transactions are well-formed; and providing, through the access nodes, the one or more signed hashes to the security nodes for validation. In some embodiments, the operations comprise: checking, through the access nodes, the credentials of the one or more transactions to determine that the one or more transactions are well-formed. In some embodiments, the one or more signed hashes indicate that the respective one or more transactions are well-formed and that the respective one or more transaction texts will be persisted until the execution nodes have finished processing the one or more transactions. In some embodiments, the operations comprise: providing, through the access nodes, the one or more signed hashes to the security nodes when a consensus is reached by the access nodes that the one or more transactions are well-formed. In some embodiments, the operations comprise: bundling, through the access nodes, the one or more signed hashes into a collection, wherein the one or more signed hashes are provided to the security nodes for validation as the collection. In some embodiments, the operations comprise: gathering, through the security nodes, the collection and other collections, provided by the access nodes to generate the block. In some embodiments, the operations comprise: providing, through the security nodes, the guarantee for the block by performing the BFT consensus algorithm to: validate a threshold number of access nodes determined that the one or more transactions were well-formed based on the one or more signed hashes, and finalize the block. In some embodiments, the operations comprise generating, with a group of the security nodes, the block as a candidate block, the group determined according to the BFT consensus algorithm. In some embodiments, the group comprises a subset of the security nodes. In some embodiments, the group comprises all of the security nodes. In some embodiments, the candidate block is generated by gathering, through the group of security nodes, the collection and other collections, provided by the access nodes. In some embodiments, the operations comprise: determining, through the execution nodes, a query according to the finalized block; determining, through the access nodes, the transaction text for each of the one or more transactions based on the query; and determining, through the execution nodes, a result for each of the one or more transactions based on the transaction text for each of the one or more transactions. In some embodiments, the operations comprise: determining, through the execution nodes, an output for the finalized block based on the transaction text for each of the one or more transactions; presenting, through the execution nodes, a hashed commitment of the output for the finalized block to the other execution nodes; and revealing, through the execution nodes, the output for the finalized block to the access nodes when each of the other execution nodes have presented of the output for the finalized block. In some embodiments, the operations comprise: providing, through the access nodes, a state response to the client, the state response determined based on the output for the finalized block. In some embodiments, the security nodes comprise more nodes than the access nodes and the access nodes comprise more nodes than the execution nodes. In some embodiments, each of the execution nodes has more computational power than each of the access nodes and each of the access nodes has more computational power than each of the security nodes. In some embodiments, the operations comprise: receiving, through the access nodes, a hashed commitment of an output for the block from the execution nodes; and providing, through the access nodes, a query verifying the output for the block to a set of the execution nodes. In some embodiments, the operations comprise: providing, through the execution nodes, the output for the block in response to receiving the query verifying the output for the block. In some embodiments, the operations comprise: storing, through the access nodes, a cache of an output for the block; and providing, to the client through the access nodes, results of computations for the one or more transactions based on the output for the block. In some embodiments, the operations comprise: storing, through the execution nodes, an entire canonical state of the blockchain. In some embodiments, the operations comprise: storing, through only the execution nodes, the entire canonical state of the blockchain. In some embodiments, the operations comprise: slashing the access nodes if they provide a signed hash for a transaction that is ill-formed or if they fail to store a transactions text of the one or more transactions. In some embodiments, the operations comprise: slashing the security nodes if they finalize an invalid block. In some embodiments, the operations comprise: providing secure and scalable decentralized computation for one or more decentralized applications. In some embodiments, the operations comprise: providing the decentralized computation for the one or more decentralized applications without sharding or dividing a network into two or more subunits that interact asynchronously. In some embodiments, the decentralized computation for the one or more decentralized applications comprises more than 1000 tps, more than 50,000 tps, or more than 100,000 tps. In some embodiments, the operations comprise: providing decentralized computation for, more than 10, more than 100, or more than 1000 decentralized applications. In some embodiments, the BFT consensus algorithm comprises a variant of CBC, Tendermint-derived SBFT, Hot Stuff, or Fantomette. In some embodiments, the finalized block determines an order of the transactions.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 3A and 3B depict a non-limiting example process that can be implemented by the various nodes in the described decentralized computation system;

DETAILED DESCRIPTION OF THE INVENTION

Figure 1:
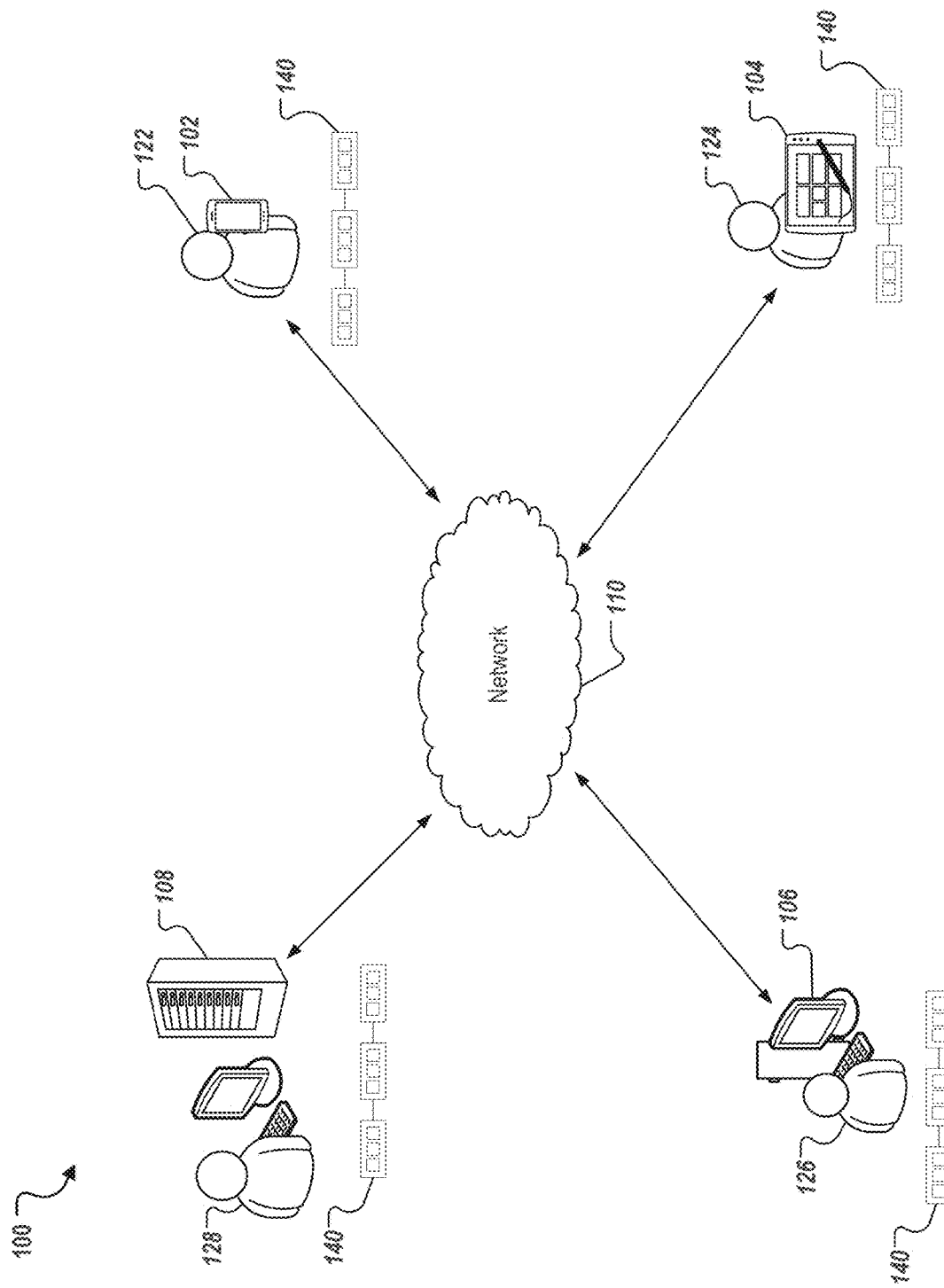
FIG. 1 depicts a non-limiting example environment that can be employed to execute implementations of the present disclosure.

Described herein, in certain embodiments, are decentralized computation systems for a for providing secure and scalable decentralized computation for one or more decentralized applications comprises: a blockchain; and a plurality of nodes comprising a plurality of each of three specialized node types, the specialized node types comprising access nodes, security nodes, and execution nodes; the access nodes configured to perform at least: receiving one or more transactions from at least one client, the one or more transactions each comprising transaction text and credentials; cryptographically signing a hash for each of the transaction text of the one or more transactions based on a determination that the one or more transactions are well-formed; providing the one or more signed hashes to the security node for validation; and providing a state response to the at least one client, the state response determined based on an output for a block; the security nodes configured to perform at least: generating a candidate block comprising the one or more signed hashes; finalizing the candidate block by performing a Byzantine fault tolerance (BFT) consensus algorithm to validate that a threshold number of access nodes determined that the one or more transactions were well-formed based on the one or more signed hashes; and providing the finalized block to the execution nodes; and the execution nodes configured to perform at least: receiving, from the access nodes, the transaction text for each of the one or more transactions based on a query provided to the access nodes, the query determined according to the block; presenting a hashed commitment of the output for the block to the other execution nodes, the output for the block determined based on the transaction text for each of the one or more transactions; and revealing the output to the access nodes when each of the other execution nodes has presented the output for the block.

Also described herein, in certain embodiments, are decentralized computation systems for adding a block to a blockchain comprises: access nodes configured to receive, from a client, one or more transactions, determine that the one or more transactions are well-formed, and provide responses to queries related to a canonical state for the blockchain; security nodes configured to provide a guarantee for the block through a BFT consensus algorithm employed to finalize the one or more transactions; and execution nodes configured to determine a result for each of the one or more transactions, once finalized, and store the canonical state of the blockchain.

Also described herein, in certain embodiments, are computer-implemented methods of adding a block to a blockchain comprising: receiving, through a plurality of access nodes, one or more transactions from a client; determine, through the access nodes, that the one or more transactions are well-formed; providing, through a plurality of security nodes, a guarantee for the block through a BFT consensus algorithm employed to finalize block; determining, through a plurality execution nodes, a result for each of the one or more transactions, once the block is finalized; storing, through the execution nodes, a canonical state of a blockchain; and providing, through the access nodes, responses to queries related the canonical state for the blockchain.

Also described herein, in certain embodiments, are one or more non-transitory computer-readable storage media coupled to one or more processors and having instructions stored thereon which, when executed by the one or more processors, cause the one or more processors to perform operations to provide a secure and scalable decentralized computation for one or more decentralized applications through a plurality of nodes comprising a plurality of each of three specialized node types, the specialized node types comprising access nodes, security nodes, and execution nodes, the operations comprising: receiving, through a plurality of access nodes, one or more transactions from a client; determine, through the access nodes, that the one or more transactions are well-formed; providing, through a plurality of security nodes, a guarantee for the block through a BFT consensus algorithm employed to finalize block; determining, through a plurality execution nodes, a result for each of the one or more transactions, once the block is finalized; storing, through the execution nodes, a canonical state of a blockchain; and providing, through the access nodes, responses to queries related the canonical state for the blockchain.

Distributed Ledger/Blockchain Overview

An example distributed ledger is the commonly known Blockchain (or blockchain). Blockchain is referenced within the present disclosure for purposes of illustration. It is contemplated, however, that any appropriate distributed ledger can be used in implementations of the present disclosure. A blockchain is a continuously growing list of records or blocks that are linked and secured using cryptography. Each block within the blockchain may include transaction data provided from transactions that have been executed in one or more contexts, such as negotiable instrument transactions, digital currency transactions, and so forth. In some examples, a transaction includes an agreement between a buyer and seller, a supplier and a consumer, or a provider and a consumer that there would be exchange of assets, products or services in lieu of currency, cryptocurrency or some other asset either in present or in future. In some examples, a single block may include transaction data provided from multiple transactions (e.g., multiple deposits of different checks by different people). A blockchain may grow as completed blocks are added with a new set of transactions thus forming a ledger of the transaction. Each block may include a hash pointer to a previous block and a timestamp along with the transaction data in a permanent manner.

In some embodiments, the transactions in a block of a blockchain are hashed and encoded into a Merkle tree (e.g., the transactions are leaf nodes of a Merkle tree). A Merkle tree (or hash-based tree) is a hash-based data structure that is a generalization of a hash list. A Merkle tree includes a tree structure in which each leaf node is a result of a cryptographic hash function (CHF) applied to the transaction to generate a hash value or "hash" and each non-leaf node is labelled with the cryptographic hash of the labels of its child nodes. Example CHFs include the secure hash algorithm 256 (SHA-256), SHA-3, and message digest 5 (MD5), among others. In general, the CHF receives information as input, and provides a hash value as output. The hash value can be a predetermined length. For example, SHA-256 outputs a 256-bit (32-byte, 64-character) hash value. In some examples, the hash value is a one-way hash value, in that the hash value cannot be 'un-hashed' to determine what the input was. Additionally, a Merkle tree may be implemented as a k-ary tree, which is a rooted tree data structure in which each node has no more than k children. For example, a Merkle tree may be implemented as binary tree where each node may have 0, 1, or 2 children. The Merkle root (or root hash) of such a binary tree can be generated by repeatedly hashing each pair of nodes until only one hash is left. In some examples, when the number of transactions is odd, the last hash is duplicated once to create an even number of leaf nodes. If a single detail in any of the transactions or the order of the transactions changes, so does the Merkle root. As such, the Merkle root summarizes all of the data in the related transactions, and can be stored in a block to maintain the integrity of the data. Thus the employment of a Merkle tree allows for a quick and simple test of whether a specific transaction is included in the set or not.

In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, entities must agree on which transactions have actually occurred, and in which order. For example, if two entities observe different transaction histories, they will be unable to come to the same conclusion regarding the validity of a transaction. The blockchain enables the entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

A typical peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a PoW before their provided block of transactions is accepted by the peer-to-peer network. A blockchain protocol includes a PoW scheme that is based on a CHF. In some embodiments, the blockchain protocol can require multiple pieces of information as input to the CHF. For example, the input to the CHF can include a reference to the previous (most recent) block in the blockchain, details of the transaction(s) that are to be included in the to be created block, and a nonce value.

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In some blockchain-based platforms, for example, each block producing node may go through a number of steps to create a candidate block. For example, a number of transactions are selected from a publicly-shared pool of pending transactions. In some embodiments, the selected transactions are assigned in an order in, for example, a linear list. Typically, there is some mechanism to limit the maximum number of transactions that can be included. In many embodiments, however, there is no enforced minimum. Computations specified by the transactions are performed. In some embodiments, each computation has access to a global shared state, and can make certain changes to that shared state. Moreover, in some embodiments, the input of one transaction could depend on the output of another transaction. In such embodiments, it is important that these computations are strictly performed in order. The transactions are combined with a snapshot of the final canonical state resulting from processing those transactions. The results are broadcast to the rest of the network. In some embodiments, the "snapshot" is a hash of the canonical state, and can be in the form of, for example, the root node of a Merkle tree.

In some embodiments, each node in the network that receives a candidate block verifies that the computations implied by the transaction list have been computed correctly. These nodes re-perform all of the computations in the order specified by the candidate block. The nodes then compare the snapshot of the final canonical state they have computed with the snapshot in the candidate block from the original node. If the snapshots match, the block is considered a valid candidate.

In unspent transaction output (UTXO) blockchains, such as Bitcoin, only transactions that successfully transfer tokens can be included in a block. On the other hand, in state-model blockchains, like Ethereum, it is valid (and even common) to include transactions that fail. In some embodiments, these transactions are included in the block, but do not modify the canonical state (aside from the payment of the transaction fees). Thus, a transaction that is "processed correctly" may not actually do what was intended by user initiating the transaction.

Once one or more valid candidate blocks are produced, the network uses some consensus mechanism for collectively agreeing on a single valid candidate. This is typically "proof-of-work" in current blockchains, but there are many proposals for future networks—or evolutions of existing networks—that use "proof-of-stake". The embodiments of the decentralized computation system, described herein, work equally well with either family of consensus mechanisms, but is most powerful when coupled with instant-finality, proof-of-stake consensus.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Smart contracts are digitization of the legal contracts and include executable code which represents, for example, contract terms. As such, a smart contract not only defines the rules and penalties related to an agreement in the same way that a traditional contract does, but also automatically enforces those obligations. A smart contract may accomplish this by taking information as input, assigning a value to that input through the rules set out in the contract, and executing the actions required by those contractual clauses. For example, a smart contract may determine whether an asset should be sent to a destination entity or whether it should be returned to an originating entity. Smart contracts may be coded in a programming language, such as Solidity™. For example, a smart contract may be programed to deliver payment when an item is received. In this format, a contract is converted to computer code, stored and replicated on the system, and supervised by a network of computers that run the blockchain. Smart contracts can store data. The data stored can be used to record information, fact, associations, balances and any other information needed to implement logic for real world contracts. In some embodiments, a smart contract is deployed, stored, and executed within the virtual machine.

Composability is a system design principle that deals with the inter-relationships of components. For example, a highly composable system provides components that can be selected and assembled in various combinations to satisfy specific user requirements. In the context of blockchain and smart contracts, composability includes the ability to chain together operations involving multiple independent smart contracts. A recent example of composability is dY/dX, which is a decentralized protocol for financial derivatives built on the Ethereum blockchain. dY/dX allows for decentralized margin trading by enabling collateralized loans. A typical dY/dX transaction combines at least three separate smart contracts: The core dY/dX contract itself, a decentralized exchange like 0x, and at least one Ethereum Request for Comment (ERC)-20 token such as DAI.

Sharding is a concept that's widely used in databases, to make them more scalable. More recently, sharding has been employed for blockchain to improve transaction speed in the blockchain. Generally, "sharding" refer to a variety of scaling proposals that divide the network into a series of subunits which interact asynchronously. In a database context, for example, sharding is a method for horizontally partitioning data within a database. More generally, the database is broken into little pieces called "shards", that when aggregated together form the original database. In distributed blockchain networks, the network consists of a series of nodes connected in a peer to peer format, with no central authority. In some examples, of blockchain systems, each node stores all states of the network and processes all of the transactions. While this provides the high level security through decentralization, especially in PoW systems such as Bitcoin and Ethereum®, it leads to legitimate scaling problems. For example, a full node in the Ethereum network stores the entire state of the blockchain, including account balances, storage, and contract code. Unfortunately as the number of participants increases linearly, the inter-communication overhead between them increases at an exponential pace. This limitation is due to the communication needed between the nodes needed to reach consensus. Nodes in the network do not have special privileges and every node in the network stores and processes every transaction. As a result, in a network the size of Ethereum's, issues such as high gas costs and longer transaction confirmation times become noticeable problems when the network is strained. The network is only as fast as the individual nodes rather than the sum of its parts. As such, sharding helps to alleviate these issues. The concept involves grouping subsets of nodes into shards that in turn process transactions specific to that shard. Employment of this type of architecture allows a system to process many transactions in parallel.

A consensus algorithm or protocol is a set of rules that describe how the communication and transmission of data between electronic devices, such as nodes, works. Consensus is achieved when enough devices are in agreement about what is true and what should be recorded onto a blockchain. Therefore, consensus protocols are the governing rules that allow devices that are scattered across the world to factually come to an agreement, allowing a blockchain network to function without being corrupted.

A BFT consensus algorithm, in context of distributed systems, includes the ability of a distributed computer network, such as the peer to peer network of nodes in the described decentralized computation system, to function as desired and correctly reach a sufficient consensus despite malicious components (nodes) of the system failing or propagating incorrect information to other peers. The objective is to defend against catastrophic system failures by mitigating the influence these malicious nodes have on the correct function of the network and the right consensus that is reached by the honest nodes in the system.

In some embodiments, to slash a network participant is to punish them for failing to follow the rules set out for the network. Punishment may be in the form of a fine applied to funds they have put in escrow, or staked.

System Overview

As described above, in some embodiments, the described decentralized computation system divides nodes in the network into three distinct roles: Access, Security, and Execution. This separation of concerns enables high throughput without sacrificing synchrony, in an environment that maintains the access, security, reliability, and verifiability guarantees that characterize and uphold the integrity of a decentralized system. In some embodiments, the core relationship between the different node types is one of checks and balances, which ensures strong consensus on transaction inclusion, order, and output, and determines the canonical state of history. One of the challenges of this approach is coordinating three separate groups of nodes and ensuring efficient interactions between them.

In some embodiments, the described decentralized computation system provides the transaction capacity and computational throughput to support a thriving and engaging ecosystem that may be made available to mass market audiences (e.g., billions of active users). Just how far current networks are from achieving this goal became apparent with the launch of CryptoKitties®. With fewer than thirty thousand active users, CryptoKitties disrupted the Ethereum network resulting in week-long transaction processing times for some users. The technology had missed, by many orders of magnitude, the capacity to survive broad adoption. In some embodiments, the described decentralized computation system handles as many as one million tps at maturity.

The described decentralized computation system does not sacrifice practical utility. In particular, in some embodiments, the system preserves fully synchronous communication between smart contracts. Full synchrony ensures that inter-contract communications retain ACID guarantees for correctness (Atomicity, Consistency, Isolation, Durability), without complex locking schemes prone to error or exploitation. In short, synchrony is required for one smart contract to be sure that another smart contract is executed correctly, and to allow independent smart contracts to be composed into complex systems without sacrificing safety.

Long-term, sustained decentralization is one aspect provided by the described decentralized computation system. Many blockchain enabled systems treat decentralization as optional or cosmetic, rather than a core value of the system. While this may result in some quick wins in the short term, those systems are likely to degrade over time. Moreover, without explicit incentives otherwise, valuable systems with any degree of centralization tend towards further centralization. The qualities of decentralization provided by the described decentralized computation system include: access, security, reliability, and verifiability.

In some embodiments, the described decentralized computation system provides access through the ability to use the system resources of the network at a fixed cost (provided a user is able to pay for their usage). Such access provides that there is no actor, or plausible cabal of actors, that can deny any class of users from using the network, or who can prioritize some traffic over others.

In some embodiments, the described decentralized computation system maintains security by ensuring that each honest participant in the network has the same view of history as every other honest participant, and that this historical record cannot be modified after-the-fact.

Reliability includes the assurance that the rules of the system are applied uniformly, strictly enforced, and can change only in predictable, transparent ways. In some embodiments, the described decentralized computation system provides reliability by ensuring that there is no actor, or plausible cabal of actors, that can change these rules in a way without allowing users of the system to opt-out of those changes (through a hard fork, for example).

In some embodiments, the described decentralized computation system is verifiable in that it allows for transparency of all actions. As such, anyone can confirm, using, for example, computer resources under their own control, that the protocol (and the rules defined within the protocol) has been followed correctly. This implicitly includes the ability to see all on-chain activity.

The described decentralized computation system guarantee of access, security, reliability, and verifiability, captures a much broader set of benefits from a decentralized environment. For example, guaranteeing access ensures anyone can join the network and easily understand the rules to which the network is bound. Moreover, a secure network enacts those rules without fail. This combination produces an environment in which users can reason about the system and, with a known set of inputs, reliably predict and ultimately verify an outcome. Together, these requirements provide the robust criteria needed to achieve full decentralization and the associated benefits of transparency, autonomy, interoperability, and immutability.

Figures

FIG. 1 depicts an example environment 100 that can be employed to execute implementations of the present disclosure. The example system 100 includes computing devices 102, 104, 106, 108, and a network 110, which may be used to form a peer-to-peer network. In some embodiments, the network 110 includes a local area network (LAN), wide area network (WAN), the Internet, or a combination thereof, and connects devices (e.g., the computing devices 102, 104, 106, 108). In some embodiments, the network 110 can be accessed over a wired and/or a wireless communications link. For example, mobile computing devices (e.g., the smartphone device 102 and the tablet device 104), can use a cellular network to access the network 110. In some examples, the users 122-128 may be working as user agents that employ agent software to interact with the decentralized computation system. For example, the users may employ their respective devices 102-108 to provide transaction or to function as nodes in the described system. In other examples, the users 122-128.

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is a smartphone, the computing device 104 is a tablet-computing device, and the computing device 106 is a desktop computing device.

The server computing device 108 may include any appropriate type of computing device, such as described above for computing devices 102-106 as well as computing devices with server-class hardware. In some embodiments, the server computing device 108 may include computer systems using clustered computers and components to act as a single pool of seamless resources. For example, such implementations may be used in data center, and cloud computing. In some embodiments, back-end system 130 is deployed using a virtual machine(s).

Four devices 102-108 are depicted in FIG. 1 for simplicity. It is contemplated, however, that implementations of the present disclosure can be realized with any of the appropriate computing devices, such as those mentioned previously. Moreover, implementations of the present disclosure can employ any number of devices functioning as nodes in a peer-to-peer network.

In some embodiments, the computing devices 102-108 are deployed as nodes within the described decentralized computation system and form a peer-to-peer network. For example, the computing devices 102-108 may be employed within the described decentralized computation as an access node, a security node, or an execution node, within the formed peer-to-peer network (see FIG. 2). In some embodiments, the formed peer-to-peer network is a distributed network where each network node (e.g., computing devices 102-108) is connected to every other node on the network directly or indirectly. As such, information (e.g., transactions) can be shared directly between nodes without the need of a central server. In some embodiments, the nodes employ a peer-to-peer protocol to communicate.

In some embodiments, the blockchain 150 is a decentralized blockchain that may be stored on each of the computing devices 102-108. In some embodiments, a set of the computing devices stored the blockchain 150. The blockchain 150 includes blocks that comprise transactions. In some embodiments, such transactions are received, verified and executed by the described decentralized computation system. In some embodiments, the transactions stored to the blockchain 150 include smart contracts. In some embodiments, a smart contract may be extended with custom functionality and invoked as a part of a transaction by an execution node within the formed peer-to-peer network (see FIG. 2) For example, the computing devices 102-108 may be used by respective users 122-126 to receive transactions to be processed and stored within a block on the blockchain 150. In some embodiments, the computing devices 102-108 employ a virtual machine as an execution runtime to execute smart contract code. For example, such mechanism allows transitions from one state to another: given a certain block (in which a number of transactions are stored), and given a state s, performing the computation will bring the machine into a new state s'. In some embodiments, the state transition mechanism consists of accessing transaction-related accounts, computing operations, and updating/writing the state of the virtual machine. Whatever is executed on the virtual machine (e.g., smart contract code) will alter its state. In some embodiments, after executing all the transactions of a block, the current state will be stored. See the description of FIG. 2 below with regard to the differentiation of nodes and each's function within the formed peer-to-peer network.

Figure 2:
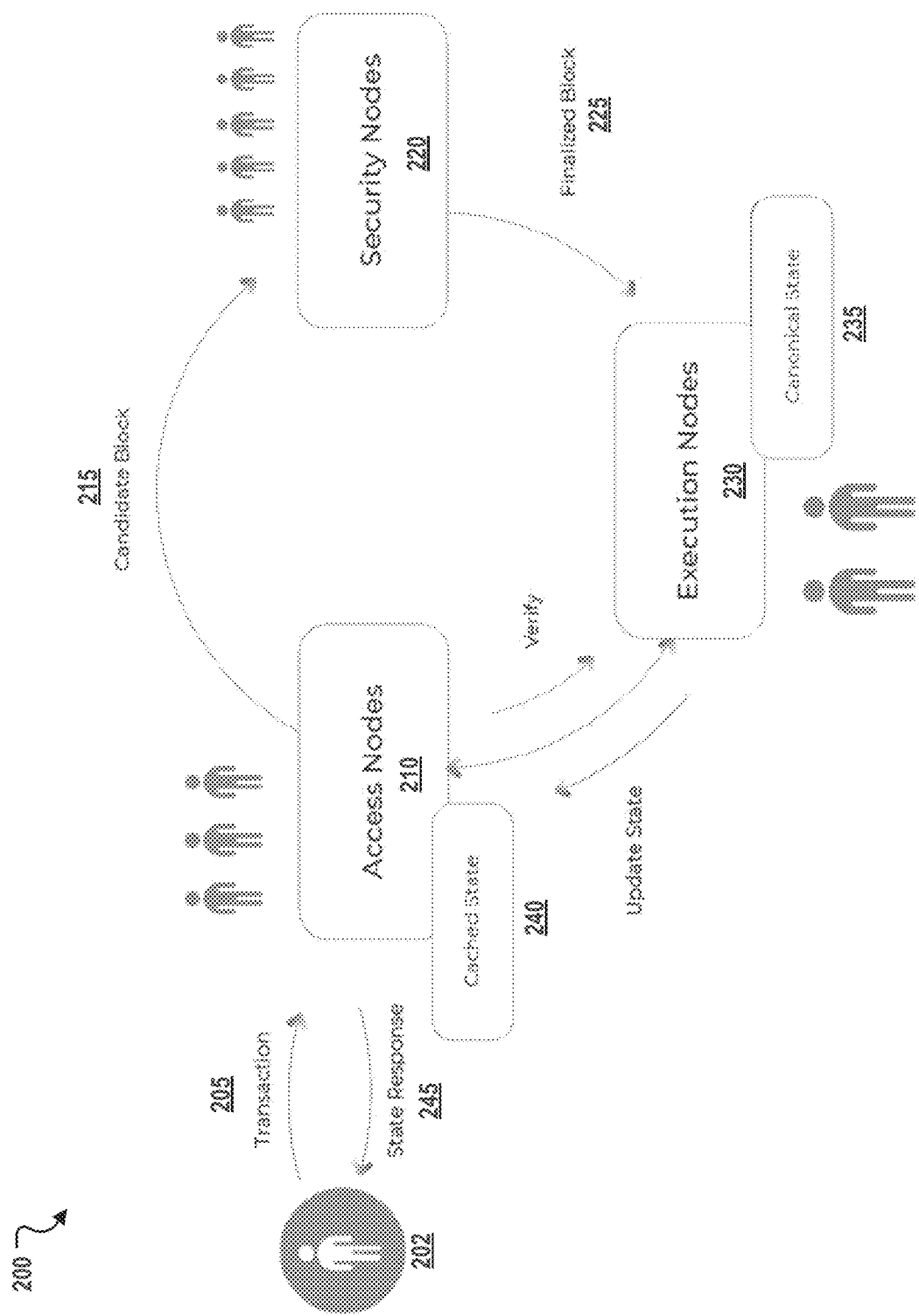
FIG. 2 depicts a non-limiting example of a general architecture for the described decentralized computation system.

FIG. 2 depicts an example of a general architecture 200 for the described decentralized computation system, which can be deployed through, for example, the example environment 100 of FIG. 1. The general architecture 200 includes a client 202, access nodes 210, security nodes 220, and execution nodes 230, which may be deployed through a device, such as devices 102-108 of FIG. 1. In some embodiments, the access nodes 210 maintain network availability for the client 202 and answer queries related to the world state. In some embodiments, the security nodes 220 ensure the safety of the network by participating in a BFT consensus algorithm, which provides strong guarantees for blocks. In some embodiments, the execution nodes process the blocks (finalized blocks 225) once received from the security nodes 220. In some embodiments, the execution nodes function as the nodes with the most specialized requirements, provide the computational power to determine the result of transactions, such as transaction 205, finalized by the security nodes 220, and store a resultant world state. A more detailed explanation of these roles is provided below.

In some embodiments, the described decentralized computation system employs a decentralized blockchain, such as the blockchain 150 of FIG. 1. In some embodiments, the job of a decentralized blockchain can be divided into a variety of component functions; some of those functions are fully deterministic and have an objectively correct output, and some of those tasks are subjective and require network-level consensus. The distinction between these two kinds of functions is what makes the separation of concerns so powerful. One of the breakthroughs of blockchain is that it allowed for the creation of an autonomous, leaderless, and decentralized system to reliably come to network consensus on something that is naturally subjective: what transactions are included in the shared state, and in what order (the "transaction log"). In some embodiments, such a subjective task either requires an all-powerful central authority to dictate the transaction log, or one of the many consensus systems that allow a decentralized network to determine a shared view of a canonical transaction log. Two other key tasks of a blockchain are not subjective, and are fully deterministic: storing the transaction log, and determining the world state that results from a correct application of the contents of the log in consensus order. The primary bottlenecks preventing blockchains from reaching consumer scale fall into this second category.

In some embodiments, the described decentralized computation system is designed so that all Byzantine faults in deterministic processes have four important attributes: detectability, attributably, punishably, and correctability. In some embodiments, a deterministic process has an objectively correct output. Meaning even a single, honest node in the network can detect deterministic faults, and prove the error to all other honest nodes by asking them to recreate part of the process that was executed incorrectly. Moreover, in some embodiments, the deterministic processes in the described decentralized computation system are assigned to nodes using a VRF. As such, any error that has been detected can be clearly attributed to those nodes that were responsible for that process. In some embodiments, all nodes participating in the described decentralized computation system, even in deterministic processes, must put up a stake that can be slashed if they are found to have exhibited Byzantine behavior. Since all errors in deterministic processes are trivially detectable and attributable, those errors can be reliably punished via slashing. In some embodiments, the described system must have a means to quickly undo errors as soon as they are detected. This serves to deter malicious actors from inducing errors that benefit them more than the slashing penalty.

The design of the described system was informed by the insight that many participants are needed to support the non-deterministic parts of the process, while far fewer are needed for deterministic processes because their properties dictate definitive detection, and, therefore, the punishment of those who do not adhere to the protocol. Therefore, the described system separates out deterministic processes (as depicted in FIG. 2) and assigns them to fewer, more powerful participants who are scrutinized by a broad audience. Fewer nodes make the deterministic elements of the network much more efficient, especially for executing computation. For example, one proof of concept shows that this approach can achieve more than 100,000 tps, without any degradation of security guarantees. The proof of concept for performance in a testbed setup as a heterogeneous network of more than 30 nodes running in 11 different data centers on five continents. This is just one example of the improvements possible when problems are separated into their deterministic and nondeterministic parts, and assigned accordingly.

In some embodiments, the access nodes 210 mediate information exchange with the world outside the described decentralized computation system, ensuring systematic and timely communications regarding both state and history. In some embodiments, the access nodes 210 are tasked with managing the transaction pool and collecting well-formed transactions, such as transaction 205 from the client 202, to provide to the security nodes 220. In some embodiments, a well-formed transaction must include credentials from a guarantor of the transaction. In some embodiments, when an access node 210 sees a well-formed transaction, it hashes the text of that transaction and signs the transaction to indicate two things: first, that it is well-formed, and second, that it will commit to storing the transaction text until the execution nodes 230 have finished processing it. In some embodiments, when a critical number of access nodes 210 have reviewed the transaction and concluded it is well-formed, they pass it to the security nodes 220 for review.

In some embodiments, after both the security nodes 220 and the execution nodes 230 have built and processed a block, the access nodes 210 make their second appearance in the process to query the execution nodes 230 for their output (e.g., the results of computations). In some embodiments, the access nodes 210 store a cache of that output received from the execution nodes 230. In some embodiments, the access nodes 210 provide the client 202 with the cached results (e.g., the state response 245) of computations without having to burden the execution nodes 230 with more direct queries. In some embodiments, a VRF determines which outputs from the execution nodes 230 that the access nodes 210 must query to check they were computed correctly. Ultimately, the access nodes 210 keep the execution nodes 230 "honest"; this balance of power maintains the access, security, and verifiability criteria of decentralization provided by the described system. The provided protocols and underlying structures of the system are highly BFT because, in some embodiments even if there are a substantial number of byzantine errors in the pool of access node 210, the security nodes 220 are still required to approve the transactions they signed were reviewed by a critical amount of the network.

In some embodiments, the access nodes 210 require high levels of bandwidth and low latency to communicate with the public as their queries and transactions must be answered and captured, respectively. In some embodiments, the access nodes 210 (e.g., the users 122-128 of FIG. 1) are paid a flat fee for every transaction they guarantee, and for each they successfully verify. In some embodiments, the access nodes 210 are slashed if they provide collections that are ill-formed, or if they fail to store the transaction text they said they would hold.

In some embodiments, the security nodes 220 participate in the consensus algorithm employed by the described system to achieve block finality to ensure the integrity of the blockchain. In this context, finality includes a finalized block 225 of transactions that have been signed by a critical majority and are confirmed to be both well-formed and stored by the access nodes 210. In some embodiments, the security nodes 220 contribute primarily to security and scale, as they are able to vote quickly on candidate blocks 215 that set the order necessary to know the deterministic output of a transaction. In some embodiments, the security nodes 220 validate that the signed transaction hashes submitted to them by the access nodes 210 are signed by a critical mass of access nodes as required by the described system. In some embodiments, the critical mass of access nodes is determined by a configurable threshold value.

In some embodiments, once the security nodes 220 have successfully come to consensus that the transactions presented were signed by the critical number of the access nodes 210, the transactions are deemed a finalized block 225. The security of the process within the described system relies on the security of the underlying consensus algorithm, the key considerations of which are speed and the ability to support a large number of participants. In some embodiments, the consensus algorithm employed by the described decentralized computation system includes a variant of Casper CBC, Tendermint-derived SBFT, Hot Stuff, Fantomette, or others well suited to support many participants. In some embodiments, the finalized block determines the order of the included transactions. In some embodiments, the ordering of transactions is based on the order of collections, and of ordering of the transactions within collections. In some embodiments, the ordering of these elements in turn is via a pseudo-random algorithm executed by the proposing node.

In some embodiments, the security nodes 220 provide a checkpoint against the access nodes 210 because they are the group checking that a critical number of the access nodes 210 reviewed and signed for the transaction. In some embodiments, the security nodes 220 are notably held accountable only by fellow security nodes 220. A common concern with PoW- and PoS-based systems is that a small subset of the population can control important resources, such as the mining or stake needed to produce and vote on blocks, which is a degradation of the security of the system. In some embodiments, by lowering the requirements to participate, the described decentralized computation system makes it extremely difficult and expensive to, for example, coordinate a Byzantine cartel.

In some embodiments, the security nodes 220 have minimal bandwidth and computation requirements, allowing even a modest computing device, such as a smartphone or a low-power ARM® system, to participate in the voting process and ensure the safety of the network. Many networks claim open participation although substantial resources—stake, computation, or otherwise—are needed to partake. Maintaining such a threshold undermines the security of the network. Lowering the participation requirements, such as described above for the security nodes 220, preserves the coordination problem, which is central to providing a high degree of BFT because it's exceedingly difficult for a subset of bad actors to subvert the network. In some embodiments, the security nodes 220 are paid for all the transaction they include in a block. In some embodiments, participating in the consensus process requires these nodes to put up stake, which is slashed if they sign an invalid block. In some embodiments, an invalid block fails to have the critical number of signatures from the access nodes 210.

In some embodiments, the execution nodes 230 compute the outputs of the finalized blocks 225 they are provided. In some embodiments, the execution nodes 230 execute a candidate block 215 that has been finalized and provided by the security nodes 220 (finalized block 225). In some embodiments, the execution nodes 230 query the access nodes 210 for the transaction text that matches the hash they have been provided by the security nodes 220. With this data, the execution nodes 230 are able to compute the output, which, in some embodiments, is later randomly queried by a by a randomly assigned subset of access nodes 210 to ensure honesty. In some embodiments, the execution nodes 230 are primarily responsible for the describe system's improvements in scale and efficiency because only a very small number of these powerful computer resources are required to compute and store the historical state.

In some embodiments, one of the execution nodes 230 presents a hashed commitment once it has computed the output of the finalized block 225 or a subset of the transactions within the finalized block 225. In some embodiments, this output is only revealed once its co-executors, (e.g., other execution nodes 230 as determined by, for example, a VRF), have also submitted their outputs. This is important to ensure nodes are not spoofing each other's work. In some embodiments, once the execution nodes 230 have submitted their answers, the output is revealed. In some embodiments, once revealed, the output is subject to random queries and checks run by the access nodes 210. In some embodiments, the execution nodes 230 have relatively low BFT. However, this does not compromise the overall security of the system because the process they perform is deterministic. For example, any bad actor will easily be detected and punished by the access nodes 210.

In some embodiments, this relatively small group of nodes (the execution nodes 230) has the most substantial technical requirements for processor speed and bandwidth because they are tasked with all the computations necessary to determine the output of the network. In some embodiments, allowing for this degree of specialization can reduce computation costs by at least one thousand times, and possibly much more, when compared to Ethereum.

In some embodiments, although the execution nodes 230 are responsible for computing and storing the entire world state of the blockchain, the execution nodes 230 are not required to answer all external queries about that state. In some embodiments, the execution nodes 230 must answer the access nodes 210 at least once during the verification period to confirm their output. In some embodiments, this query provides the access nodes 210 the answer (e.g., the state response 245) for future queries from the client 202, such as described above, which spares the execution nodes 230 of those excess queries burdening them in the future. However, in some embodiments, the execution nodes 230 can be punished (e.g., slashed) if they fail to provide answers about their output to the access nodes 210 when prompted. In some embodiments, the execution nodes 230 are paid for their work at the end of the verification period, once their outputs have been verified. In some embodiments, the costs charged by the execution nodes 230 varies by computation, and is likely to be based on the number of instructions the computation required.

In some embodiments, the common thread between these different node types (access 210, security 220, and execution 230) is their relationship to, and authority over, the state held by the network. For example, in some embodiments, the entirety of the world state is held by each and every execution node 230 in order to perform computations. In some embodiments, once the execution nodes 230 have run the computations and determined the output, they update the world state after which it is validated by the access nodes 210. In some embodiments, the execution nodes 230 must provide a Merkle proof for the output state in question. This complexity allowed for the validation of the integrity of the outputs.

In some embodiments, the access nodes 210 cache the most recently updated or accessed data in a sharded fashion (the cached state 240), with each access node 210 holding a fraction of the overall canonical state 235. This cached state 240 ensures data is easily accessible to answer user queries (e.g., provide the answer state 245 to the clients 202) in the event the execution nodes 230 are busy and cannot answer. This ability to provide answers more quickly ensures access and the verifiability of the network for the public. In some embodiments, the access nodes 210 are also responsible for holding transaction data until a transaction is processed and the result verified by the execution nodes 230. In some embodiments, once processed, the transaction itself becomes part of the canonical state 245 and the access nodes 210 are no longer required to store the cached state 240 (e.g., the transaction text).

In some embodiments, when a transaction is generated (e.g., by one of the client devices 202) it includes: explicit code to be run and/or explicit data (e.g., a smart contract), and credentials from the account paying for the transaction, which can be different from the user account generating the transaction or the data holder. In some embodiments, this transaction is submitted to the network, where it is processed by the access nodes 210 to, for example, check the credentials. In some embodiments, the access nodes 210 sign the transaction to commit to holding that transaction until the execution nodes 230 have processed it and their output has been verified. In some embodiments, once a critical mass of the access nodes 210 have signed the transaction, it is passed to the security nodes 220 to verify two things: 1) that a critical mass of access nodes 210 have seen the transaction, agreed to store it, and confirmed it is well formed, and 2) that the security nodes 220 will never confirm another block at that height, unless they are provided with proof that what they previously published was invalid.

In some embodiments, the security nodes 220 follow a BFT consensus algorithm to agree on the finalized block 225. In some embodiments, once a candidate block 205 is finalized by the security nodes 220, the finalized block 225 is passed to the execution nodes 230 for computation. In some embodiments, a VRF is employed to determine a subset of the execution nodes 230 that are responsible for computing each finalized block 225. In some embodiments, once an execution node 230 has computed the output, the execution node 230 produces a hashed commitment of the result. In some embodiments, when all of the selected nodes (e.g., the execution nodes in the determined subset) have submitted their commitments, they reveal the unencrypted result output. In some embodiments, when this output is shown to be the same from all of the participating execution nodes 230, each of the access nodes 210 uses a VRF to select a small number of transactions to be verified. In some embodiments, once the answer is provided to the access nodes 210 they cache it to answer future queries from the client 202. For example, when a user wants to retrieve a state from the system, they pose a query (e.g., through the client 202) to an access nodes 210. For example, the query may be in a form such as "what is the contents of this register at this block height?" In some embodiments, the access nodes 210 will either fulfill the query through the cached state they hold, or they will query the execution nodes 230 for the output.

In some embodiments, a transaction, and the respective block that it is include within, will be considered canonized only after a verification period is over. In some embodiments, during the verification period, for example, the results are open to both the access nodes 210 and the public to submit proofs of an incorrect output. In some embodiments, a verification period may be up to a few hours long.

In some embodiments, by dividing the architecture of the described decentralized computation system as described above, three key benefits are achieved: synchrony, efficiency, and scale. For example, developing in a decentralized environment comes with many uncertainties for developers, not the least of which is reading from data that changes before they can write to it. With this in mind, strong serializability guarantees, an outcome equivalent to a sequential schedule without overlapping transactions, are one of the most important things a decentralized development environment, such as an environment provided by the described decentralized computation system can offer. By committing to the order of transactions, transactions can appear to have been executed in an absolute order so that a developer can reason about the system, even if some were executed in parallel to improve throughput. Some systems resort to locking mechanisms to preserve serializability, especially when transactions move between shards. In some embodiments, the described decentralized computation system protocol's agreement on order before Execution Nodes determine output, however, ensures that once a transaction is ordered, there is certainty about its outcome.

In some embodiments, to efficiently employ resources, the described decentralized computation system comprises a PoS-based system and is designed to eliminate as many redundant tasks as possible. For example, in a classic blockchain implementation, every node is required to review every transaction and store all the states. By dividing deterministic and non-deterministic tasks, and assigning them to resources that can specialize in their respective execution, the throughput of the described decentralized computation system is immensely improved.

In some embodiments, at an architecture level, the security of the described decentralized computation system provided by 1) the division of power and accountability between the three different node types, 2) the high degree of participation supported by the consensus algorithm, and 3) designating the access nodes 210 as the interfaces of the network. These design elements surface differently to address each of the common attacks decentralized systems often face. The access and verifiability requirements of the described decentralized computation system ensure both the broader network and the public are able to verify the process and dispute it during the verification period. While the output of a computation is deterministic, in some embodiments, once its order is set in the finalized block 225, a verification period remains for the state to be recomputed in the event that a provable error is submitted to the network, thus ensuring the opportunity for detectability. For example, in some embodiments, the access nodes 210 sign every transaction to assure a signatory guarantor exists to pay for the transaction, guaranteeing attribution. In some embodiments, all nodes are staked relative to the value they stand to lose if they are removed from that part of the network, which assures punishment (e.g., slashed) if an infraction is committed.

In the blockchain context, censorship resistance means that it is very difficult for one group to deny another group's access to the network. As such, in some embodiments, a role of the access nodes 210 is to guarantee access and ensure that anyone can audit and submit transactions. In addition to the architecture-level measures put in place to combat censorship, in some embodiments the security nodes 220 only see transaction hashes. Therefore, in such embodiments, for the security nodes 220 to censor a transaction, they would need to know the hash of its signatories, data, and actions. In some embodiments, the security nodes are generally prevented from undermining the described system by the sheer volume of co-participants. Thus, collusion on any problem would be extremely difficult to coordinate.

In some embodiments, the security nodes 220 protect against a double spend attack. For example, in some embodiments, broad participation in this group materially decreases the risk of a small group colluding to honor an alternative block at the same height. For example, when this pool of nodes is presented with a group of transactions, they come to consensus on both a sufficient number of the access nodes 210 signing the group, and on that group forming the only block they will honor at that height—both at that moment and in the future. In some embodiments, any other block presented will be rejected by the network, unless a fraud proof to reject the block for one at a competing height is successfully submitted during the verification period.

In a front running attack, an adversarial node decides it is advantageous to insert its transaction before another. Such a move could be as simple as placing a higher bid in front of a competing bid, or as devious as strategically inserting a transaction to falsely manipulate its output. To combat this, in some embodiments, the execution nodes 230 perform a VRF to compute the order of the transactions. This ensures the order of the transactions is neither knowable nor able to be dictated by anyone until after the transaction has already been deterministically ordered.

In some embodiments, the access nodes 210 and the security nodes 220 each have a say in the transactions included in a block. In such embodiments, when either group is able to set the order of transactions beforehand, it presents an opportunity for them to exploit that order and prioritize their own transactions. By requiring the execution nodes to execute a VRF to reveal the canonical order of the transactions (the canonical state 235) in some embodiments, there is no way for nodes to manipulate the sequence. In some embodiments, parameters used to determine the VRF will be deterministic and dependent on an output from the security nodes 220.

Resistance to a potential flurry of fake accounts and activities is one critical aspect to maintaining the throughput of the network as such malicious transactions can cause immense strain on the nodes. In some embodiments, as the interface of the network, the access nodes are aware of the balance of each of the accounts signing a transaction. In some embodiments, a user who pays for transactions must also hold a minimum balance to submit a transaction to insure against spam.

In some embodiments, the first process performed by the access nodes 210 is to determine the list of transactions that should be submitted to the security nodes 220 for inclusion in a block, and the order in which they should occur. This process is a "pure consensus problem" where there are many possible answers to this problem, each of which is equally "right." However, the network must agree on a single answer because different choices would lead to different canonical state. Once the ordered list of transactions has been agreed upon, however, there is a single, objectively-correct answer as to what canonical state will result from processing those transactions. For example, any node that processes that transaction list without errors will, by definition, end up with exactly the same canonical state as any other node that correctly processes that same transaction list. Note: blockchain computations must be fully deterministic, to allow them to be verified by other nodes. Thus, there are two very different problems, with two very different performance profiles. First, the ordering process is a pure consensus problem that can be solved by a variety of BFT consensus algorithms. In some embodiments, such a process requires a lot communication between consensus nodes, but is not computationally complex. Network security comes directly from this process as the more nodes that are involved in this process, the harder it is to subvert the chain. Second, in some embodiments, the computation process requires very powerful nodes when the network is busy, but it does not need a large number of them as anyone can objectively "check the work" of a compute node and prove an error if it occurs. In some embodiments, when a node presents an invalid output, it loses some or all of its stake and the incorrectly processed computations can be re-run with honest nodes. The result of the above process, in some embodiments, is a single, unsharded network that is able to achieve maximum throughput without any degradation of security due to centralization.

Figure 3B:
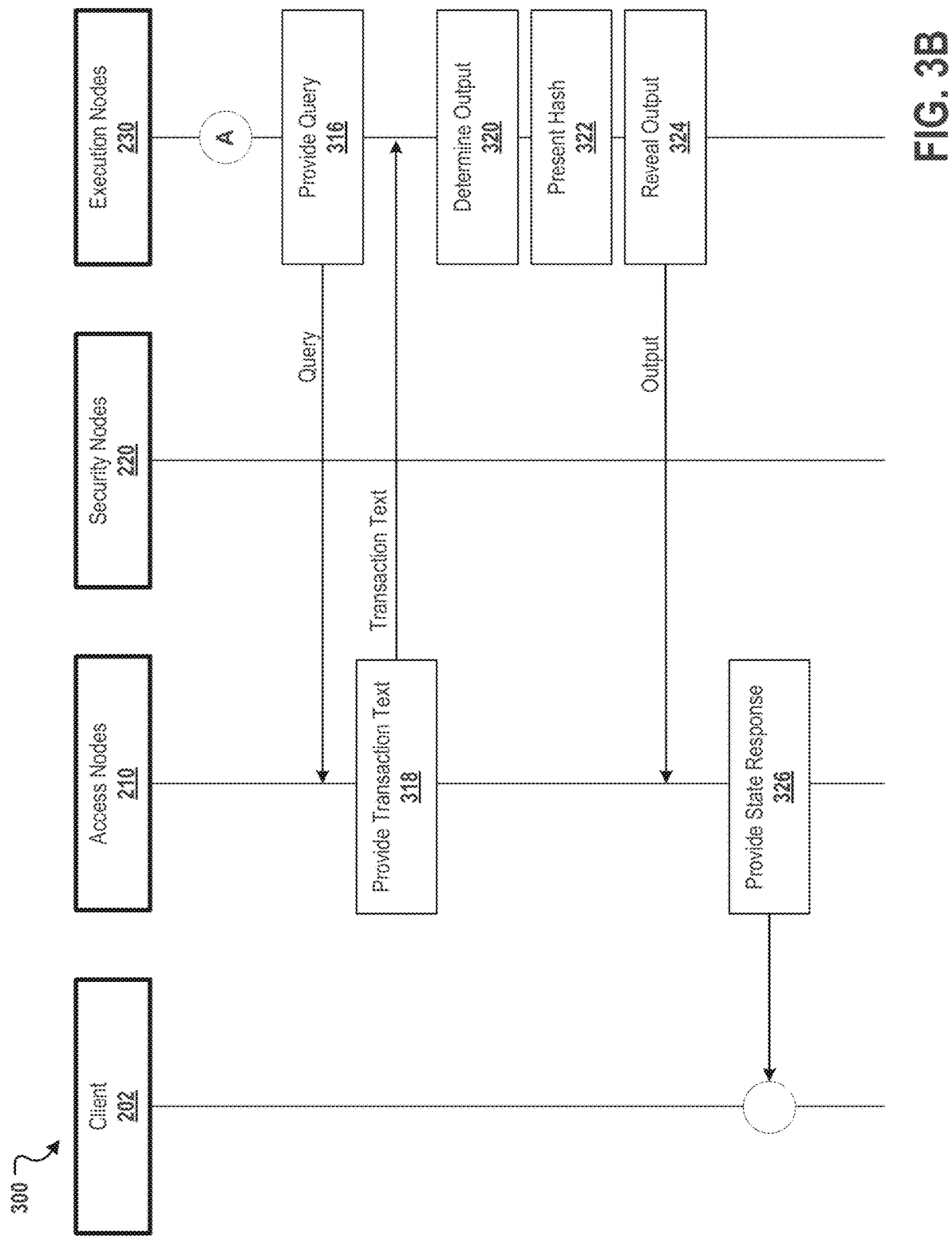
Figure 4:
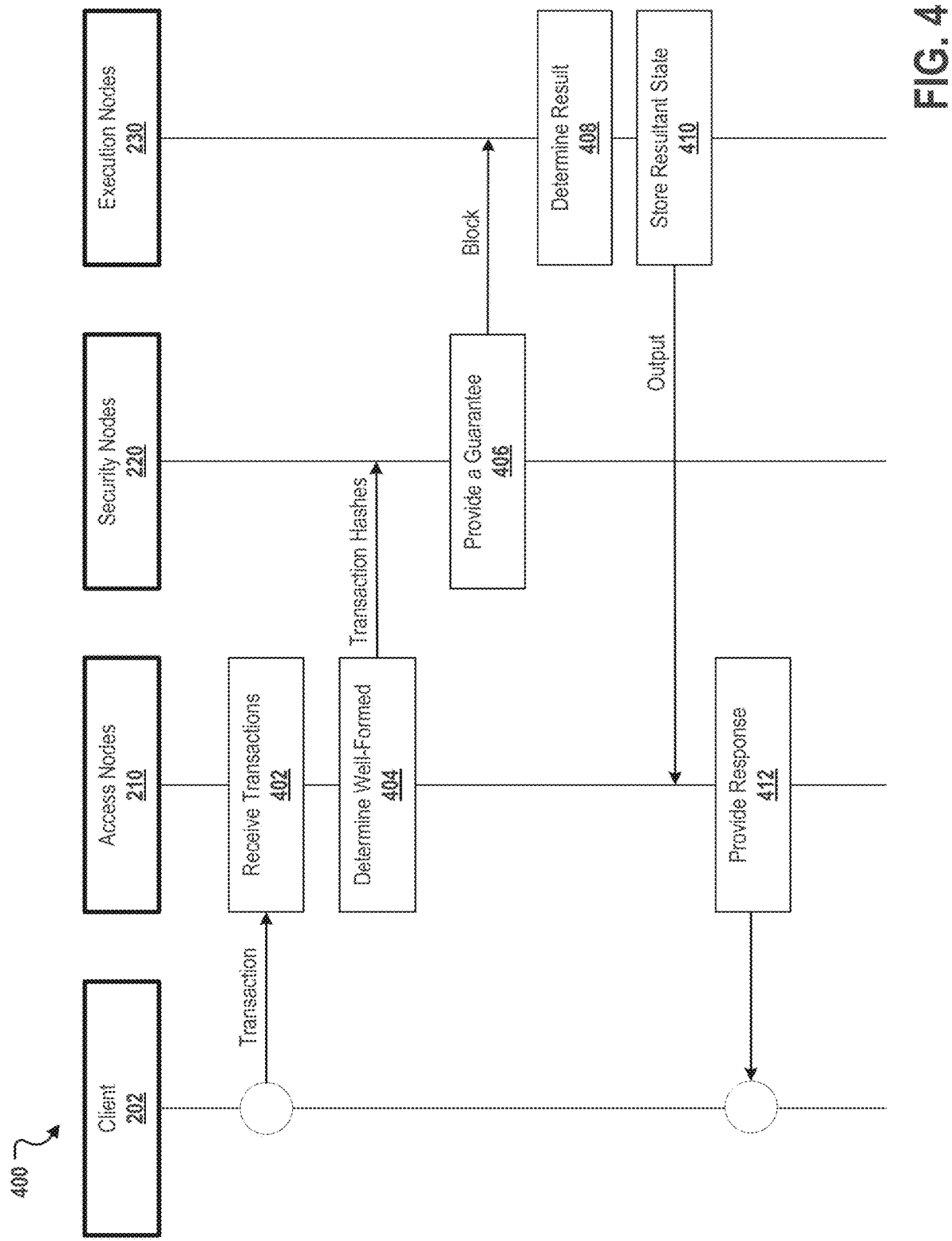
FIG. 4 depicts another non-limiting example process that can be implemented by the various nodes in the described decentralized computation system.

FIGS. 3A and 3B depict a flowchart of an example process 300. FIG. 4 depicts a flowchart of an example process 400. The example processes 300 and 400 can be implemented by the various nodes (as described above in FIG. 2) in the described decentralized computation system. The example processes 300 and 400 shows in more detail communication as well as the separation of work between the client 202, the access nodes 210, the security nodes 220, and the execution nodes 230. The flowcharts generally show how a transaction is processed, executed, and stored to the blockchain within the described decentralized computation system. For clarity of presentation, the description that follows generally describes the example processes 300 and 400 in the context of FIGS. 1, 2, and 5. However, it will be understood that the processes 300 and 400 may be performed, for example, by any other suitable system, environment, software, and hardware, or a combination of systems, environments, software, and hardware as appropriate. In some embodiments, various operations of the processes 300 and 400 can be run in parallel, in combination, in loops, or in any order.

In some embodiments of the example processes 300 and 400, the security nodes 220 comprise more nodes than the access nodes 210 and the access nodes 210 comprise more nodes than the execution nodes 230. In some embodiments of the example processes 300 and 400, each of the execution nodes 230 has more computational power than each of the access nodes 210 and each of the access nodes 210 has more computational power than each of the security nodes 220.

In some embodiments of the example processes 300 and 400, the execution nodes 230 store an entire canonical state of the blockchain. In some embodiments of the example processes 300 and 400, only the execution nodes 230 store the entire canonical state of the blockchain. In some embodiments of the example processes 300 and 400, the access nodes 210 are slashed if they provide a signed hash for a transaction that is ill-formed. In some embodiments of the example processes 300 and 400, the access nodes 210 are slashed if they fail to store the transaction text of the one or more transactions. In some embodiments of the example processes 300 and 400, the security nodes 220 are slashed if they finalize an invalid block 215. In some embodiments of the example processes 300 and 400, the described decentralized computation system provides the decentralized computation for the one or more decentralized applications without sharding or dividing a network into two or more subunits that interact asynchronously. In some embodiments of the example processes 300 and 400, the described decentralized computation system provides the decentralized computation for, more than 10, more than 100, or more than 1000 decentralized applications. In some embodiments of the example processes 300 and 400, the decentralized computation for the one or more decentralized applications comprises more than 1000 tps, more than 50,000 tps, or more than 100,000 tps. For example comparisons, alternative blockchains systems process the following number of tps: Bitcoin: 7 tps, Ethereum: 15 tps, Cosmos: 200 tps.

For process 300 as depicted in FIGS. 3A and 3B, at 302, the access nodes 210 receive a transaction from the client 202. In some embodiments, the transaction comprises transaction text and credentials. In some embodiments, the credentials are for a guarantor of the one or more transactions. From 302, the process 300 proceeds to 304.

At 304, the access nodes 210 determine that the transaction is well-formed. In some embodiments, the access nodes 210 determine that the one or more transactions are well-formed by checking the credentials of the one or more transactions. From 304, the process 300 proceeds to 306.

At 306, the access nodes 210 cryptographically sign a hash for the transaction text based on the determination that the transaction is well-formed. In some embodiments, the one or more signed hashes indicate that the transaction is well-formed and that the transaction text will be persisted until the execution nodes 230 have finished processing the transaction. From 306, the process 300 proceeds to 308.

At 308, the access nodes 210 provide the signed hash to the security nodes 220. In some embodiments, the access nodes 210 provide the signed hash to the security nodes 220 when a consensus is reached by the access nodes that the transaction is well-formed. In some embodiments, the access nodes 210 bundle the signed hash into a collection with signed hashes from other received transactions. In some embodiments, the signed hashes are provided to the security nodes for validation as the collection. From 308, the process 300 proceeds to 310.

At 310, the security nodes 220 generate a candidate block comprising the one or more signed hashes. In some embodiments, the candidate block is generated by a group of the security nodes 220, the group determined according to the BFT consensus algorithm. In some embodiments, the group comprises a subset of the security nodes. In some embodiments, the group comprises all of the security nodes. From 310, the process 300 proceeds to 312.

At 312, the security nodes 220 finalizing the candidate block by performing a Byzantine fault tolerance (BFT) consensus algorithm to validate that a threshold number of access nodes determined that the one or more transactions were well-formed based on the one or more signed hashes. In some embodiments, the BFT consensus algorithm is a variant of CBC, Tendermint-derived SBFT, Hot Stuff, or Fantomette. In some embodiments, the finalized block determines an order of transactions. From 312, the process 300 proceeds to 314.

At 314, the security nodes 220 provide the finalized block to the execution nodes 330. In some embodiments, the security nodes 220 gather the collection and other collections, provided by the access nodes to generate the block. From 314, the process 300 proceeds to 316.

At 316, the execution nodes 230 provide a query determined according to the block to the access nodes 210. From 316, the process 300 proceeds to 318.

At 318, the access nodes 210 provide, to the execution nodes 230, the transaction text of the transactions based on the provided query. From 318, the process 300 proceeds to 320.

At 320, the execution nodes 230 determine an output for the block based on the transaction text. From 320, the process 300 proceeds to 322.

At 322, the execution nodes 230 present a hashed commitment of the output for the block to the other execution nodes 230. In some embodiments, the transaction text is persisted by the access nodes until the execution nodes provide the hashed commitment of the output for the block. In some embodiments, the access nodes 210 receive the hashed commitment of the output for the block from the execution nodes 230; and provide a query verifying the output for the block to a set of the execution nodes 230. In some embodiments, the execution nodes 230 provide the output for the block to the access nodes 210 in response to receiving the query verifying the output for the block From 322, the process 300 proceeds to 324.

At 324, the execution nodes 230 reveal the output to the access nodes 210 when each of the other execution nodes 230 has presented the output for the block. From 324, the process 300 proceeds to 326.

At 326, the access node 210 provides a state response determined based on the output for the block to the client 202. In some embodiments, the access nodes 210 store a cache of the output for the block; and provide, to the client, results of computations for the one or more transactions based on the output for the block. From 326, the process 300 ends.

For process 400 as depicted in FIG. 4, at 402, the access nodes 210 receive, from the client 202, one or more transactions. In some embodiments, the one or more transactions each comprise transaction text and credentials. In some embodiments, the credentials are for a guarantor of the one or more transactions. From 402, the process 400 proceeds to 404.

At 404, the access nodes 210 determine that the one or more transactions are well-formed. In some embodiments, the access nodes 210 cryptographically sign a hash for each of the transaction text based on a determination that the one or more transactions are well-formed and provide the one or more signed hashes to the security nodes 220 for validation. In some embodiments, the access nodes 210 determine that the one or more transactions are well-formed by checking the credentials of the one or more transactions. In some embodiments, the one or more signed hashes of the transaction text of the one or more transactions indicate that the respective one or more transactions are well-formed and that the respective one or more transaction texts will be persisted until the execution nodes have finished processing the one or more transactions. In some embodiments, the access nodes 210 bundle the one or more signed hashes into a collection. In some embodiments, the one or more signed hashes are provided to the security nodes 230 for validation as the collection. In some embodiments, the security nodes 230 gather the collection and other collections, provided by the access nodes to generate the block. In some embodiments, the access nodes 210 provide the one or more signed hashes to the security nodes when a consensus is reached by the access nodes that the one or more transactions are well-formed. In some embodiments, the access nodes 210 persist the transaction text for each of the one or more transactions until the execution nodes present the hashed commitment of the output for the finalized block. In some embodiments, the access nodes 210 provide the transaction text for each of the one or more transactions when queried by the execution nodes. In some embodiments, the access nodes 210 receive a hashed commitment of an output for the block, and provide a query verifying the output for the block to a set of the execution nodes. From 404, the process 400 proceeds to 406.

At 406, the security nodes 220 provide a guarantee for a block through a BFT consensus algorithm employed to finalize the block. In some embodiments, the block comprises the one or more signed hashes. In some embodiments, the security nodes 320 provide the guarantee for the block by performing the BFT consensus algorithm to: validate a threshold number of access nodes determined that the one or more transactions were well-formed based on the one or more signed hashes, and finalize the block. In some embodiments, the block is generated with a group of the security nodes 320 as a candidate block. In some embodiments, the group determined according to the BFT consensus algorithm. In some embodiments, the group comprises a subset of the security nodes. In some embodiments, the group comprises all of the security nodes 320. In some embodiments, the candidate block is generated by gathering, through the group of security nodes 320, the collection and other collections, provided by the access nodes 210. In some embodiments, the BFT consensus algorithm comprises a variant of CBC, Tendermint-derived SBFT, Hot Stuff, or Fantomette. In some embodiments, the finalized block determines an order of the transactions. From 406, the process 400 proceeds to 408.

At 408, the execution nodes 230 determine a result for each of the one or more transactions once the block is finalized. In some embodiments, execution nodes 230 provide a query determined according to the finalized block to the access nodes 210 and determine a result for each of the one or more transactions by receiving, from the access nodes, the transaction text for each of the one or more transactions based on the query. From 408, the process 400 proceeds to 410.

At 410, the execution nodes 230 store the canonical state of the blockchain. In some embodiments, execution nodes 230 determine an output for the finalized block based on the transaction text for each of the one or more transactions; present a hashed commitment of the output for the finalized block to the other execution nodes; and reveal the output for the finalized block to the access nodes when each of the other execution nodes has presented the output for the finalized block. In some embodiments, execution nodes 230 provide the output for the block to the access nodes in response to receiving the query verifying the output for the block. From 410, the process 400 proceeds to 412.

At 412, the access nodes 210 provide responses to queries related to a state for the blockchain. In some embodiments, the access nodes 210 provide a state response to the client, the state response determined based on the output for the finalized block. In some embodiments, the access nodes 210 store a cache of an output for the block, and provide, to the client, results of computations for the one or more transactions based on the output for the block. From 412, the process 400 ends.

Processing Devices and Processors

In some embodiments, the platforms, systems, media, and methods described herein include a processing devices, processors, or use of the same. In further embodiments, the processing device includes one or more hardware central processing units (CPUs) or general purpose graphics processing units (GPUs) that carry out the device's functions. In still further embodiments, the processing device further comprises an operating system configured to perform executable instructions. In some embodiments, the processing device is optionally connected a computer network. In further embodiments, the processing device is optionally connected to the Internet such that it accesses the World Wide Web. In still further embodiments, the processing device is optionally connected to a cloud computing infrastructure. In other embodiments, the processing device is optionally connected to an intranet. In other embodiments, the processing device is optionally connected to a data storage device.

In accordance with the description herein, suitable processing devices include, by way of non-limiting examples, cloud computing resources, server computers, server clusters, desktop computers, laptop computers, notebook computers, sub-notebook computers, netbook computers, netpad computers, handheld computers, mobile smartphones, and tablet computers.

In some embodiments, the processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the processing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display.

In some embodiments, the processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In still further embodiments, the input device is a combination of devices such as those disclosed herein.

Figure 5:
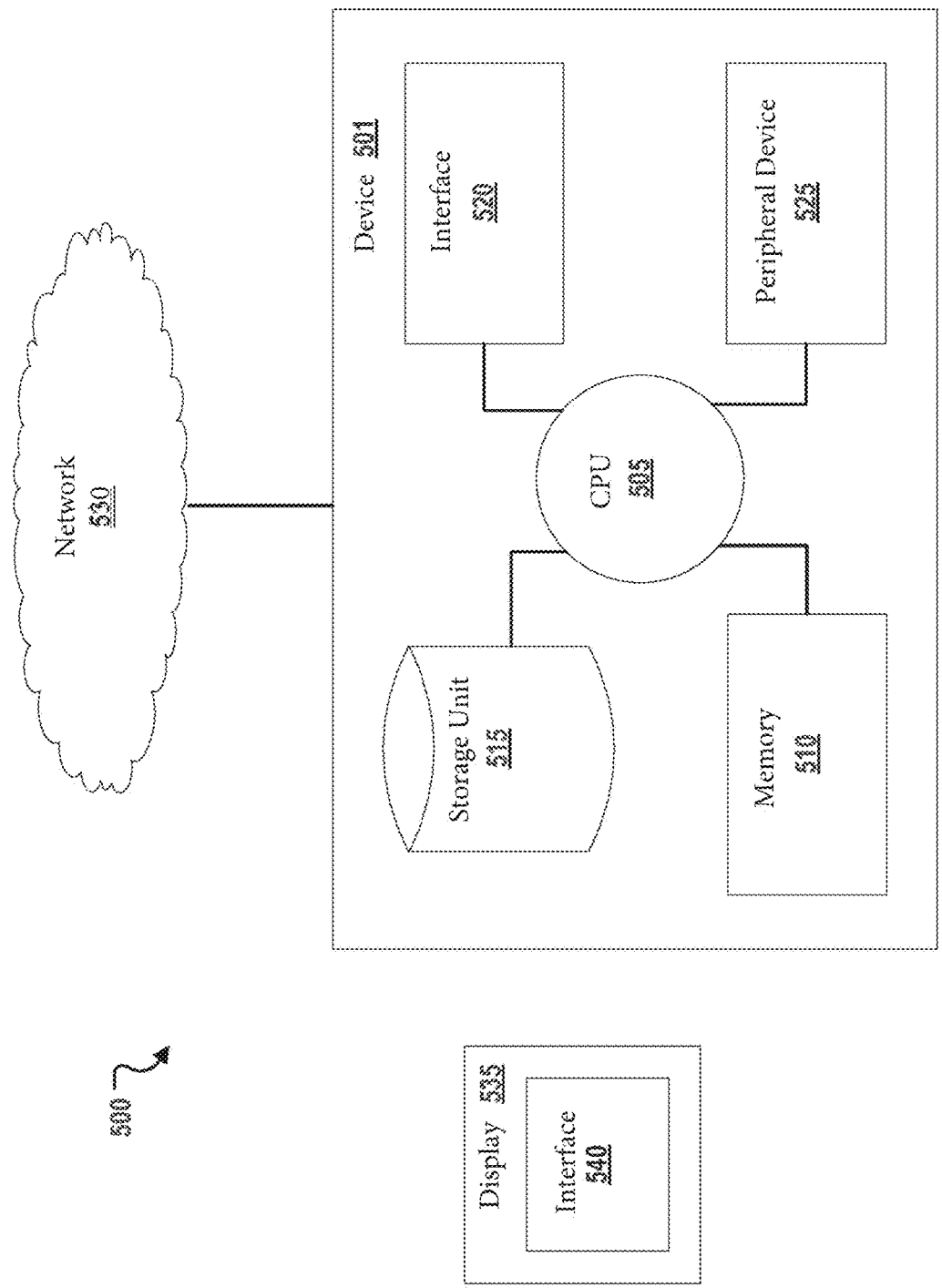
FIG. 5 shows a non-limiting example of a processing device; in this case, a device with one or more CPUs, a memory, a communication interface, and a display.

Referring to FIG. 5, in a particular embodiment 500, an exemplary processing device 501 is programmed or otherwise configured to, for example, dynamically load data provider connector modules and/or request, procure, process, analyze, persist and/or provide one or more data records. In this embodiment, the processing device 501 includes a central processing unit (CPU, also "processor" and "computer processor" herein) 505, which can be a single core or multi core processor, or a plurality of processors for parallel processing. The processing device 101 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The processing device 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, server clusters and/or distributed computing resources, providing, for example cloud computing. The network 530, in some cases with the aid of the device 501, can implement a peer-to-peer network, which may enable devices coupled to the device 501 to behave as a client or a server.

In some embodiments, the CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. The CPU 505 can be part of a circuit, such as an integrated circuit. One or more other components of the device 501 can be included in the circuit. In some cases, the circuit is an application specific integrated circuit (ASIC) or a field programmable gate array (FPGA).

In some embodiments, the storage unit 515 can store files, such as drivers, libraries and saved programs. The storage unit 515 can store user data, e.g., user preferences and user programs. The processing device 501 in some cases can include one or more additional data storage units that are external, such as located on a remote server, remote server cluster, network attached storage, or the like, that is in communication through an intranet or the Internet.

In some embodiments, methods as described herein can be implemented by way of machine (e.g., computer processor) executable code stored on an electronic storage location of the processing device 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 510 can include or be in communication with an electronic display 535. In some embodiments, the electronic display 535 provides a user interface (UI) 540.

Non-Transitory Computer Readable Storage Medium

In some embodiments, the platforms, systems, media, and methods disclosed herein include one or more non-transitory computer readable storage media encoded with a program including instructions executable by the operating system of an optionally networked processing device. In further embodiments, a computer readable storage medium is a tangible component of a processing device. In still further embodiments, a computer readable storage medium is optionally removable from a processing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the processing device's CPU, written to perform one or more specified tasks. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile processing device. In some embodiments, the mobile application is provided to a mobile processing device at the time it is manufactured. In other embodiments, the mobile application is provided to a mobile processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of data records. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, MongoDB, Oracle, DB2, and Sybase. In some embodiments, a database is web-based. In still further embodiments, a database is cloud computing-based. In other embodiments, a database is based on one or more local computer storage devices.

What is claimed is:

1. A decentralized computation system for providing secure and scalable decentralized computation for one or more decentralized applications, the system comprising:
   a plurality of nodes comprising a plurality of each of three specialized node types, the specialized node types comprising access nodes, security nodes, and execution nodes;
   the access nodes configured to provide one or more signed hashes to security node for validation;
   the security nodes configured to provide a finalized block to the execution nodes; and
   the execution nodes configured to perform at least:
      receiving, from the access nodes, transaction text for one or more transactions based on a query provided to the access nodes, the query determined according to the finalized block; and
      revealing output to the access nodes when other execution nodes has presented the output for the finalized block.

2. The system of claim 1, wherein the access nodes are configured to perform at least:
   receiving the one or more transactions from at least one client, the one or more transactions each comprising the transaction text and credentials; and
   cryptographically signing a hash for each of the transaction text of the one or more transactions based on a determination that the one or more transactions are well-formed.

3. The system of claim 2, wherein the access nodes are configured to provide a state response to the at least one client, the state response determined based on the output for the finalized block.

4. The system of claim 1, wherein the security nodes are configured to perform at least:
   generating a candidate block comprising the one or more signed hashes; and
   finalizing the candidate block by performing a Byzantine fault tolerance (BFT) consensus algorithm to validate that a threshold number of access nodes determined that the one or more transactions were well formed based on the one or more signed hashes.

5. The system of claim 1, wherein the execution nodes are configured to present a hashed commitment of the output for the finalized block to the other execution nodes, the output for the finalized block determined based on the transaction text for each of the one or more transactions.

6. The system of claim 1, wherein the access nodes are configured to provide the one or more signed hashes to the security nodes when a consensus is reached by the access nodes that the one or more transactions are well-formed.

7. The system of claim 1, wherein the transaction texts for each of the one or more transactions are persisted by the access nodes until the execution nodes provide a hashed commitment of the output for the finalized block.

8. The system of claim 7, wherein the access nodes are configured to provide the transaction text for each of the one or more transactions when queried by the execution nodes.

9. The system of claim 1, wherein the access nodes are configured to perform at least:
   receiving a hashed commitment of the output for the finalized block from the execution nodes; and
   providing the query verifying the output for the finalized block to a set of the execution nodes; and
   wherein the execution nodes are configured to provide the output for the finalized block to the access nodes in response to receiving the query verifying the output for the finalized block.

10. The system of claim 1, wherein the access nodes are configured to perform at least:
    storing a cache of the output for the finalized block; and
    providing, to at least one client, results of computations for the one or more transactions based on the output for the finalized block.

11. The system of claim 1, wherein credentials are for a guarantor of the one or more transactions, and wherein the access nodes are configured to determine that the one or more transactions are well-formed by checking the credentials of the one or more transactions.

12. The system of claim 1, wherein the access nodes are slashed if they provide a signed hash for a transaction that is ill-formed or if they fail to store the transaction text of the one or more transactions, and wherein the security nodes are slashed if they finalize an invalid candidate block.

13. The system of claim 1, wherein the system provides the decentralized computation for the one or more decentralized applications without sharding or dividing a network into two or more subunits that interact asynchronously.

14. The system of claim 1, wherein the system provides the decentralized computation for, more than 10, more than 100, or more than 1000 decentralized applications.

15. The system of claim 1, wherein the decentralized computation for the one or more decentralized applications comprises more than 1000 transactions-per-second (tps), more than 50,000 tps, or more than 100,000 tps.

16. The system of claim 1, wherein a candidate block is performed by a BFT consensus algorithm that comprises a variant of at least one of Casper correct-by-construction (CBC), Tendermint-derived scalable BFT (SBFT), Hot Stuff, or Fantomette.

17. The system of claim 1, wherein the access nodes are configured to bundle the one or more signed hashes into a collection, wherein the one or more signed hashes are provided to the security nodes for validation as the collection.

18. The system of claim 17, wherein the security nodes are configured to gather the collection and other collections, provided by the access nodes to generate a candidate block.

19. The system of claim 1, wherein a candidate block is generated by a group of the security nodes, the group determined according to the candidate block is performed by a BFT consensus algorithm.

20. The system of claim 19, wherein the group comprises a subset of the security nodes.

21. The system of claim 19, wherein the group comprises all of the security nodes.

22. The system of claim 1, wherein the finalized block determines an order of the one or more transactions.

* * * * *

UNITED STATES PATENT AND TRADEMARK OFFICE
CERTIFICATE OF CORRECTION

PATENT NO. : 11,770,238 B2
APPLICATION NO. : 17/493152
DATED : September 26, 2023
INVENTOR(S) : Shirley et al.

It is certified that error appears in the above-identified patent and that said Letters Patent is hereby corrected as shown below:

In the Specification

In Column 19, Line 9, delete "state s," and insert --states,-- therefor

In Column 19, Line 10, delete "state s'." and insert --states'.-- therefor

In Column 23, Line 46, delete "245" and insert --235-- therefor

In Column 24, Line 3, delete "205" and insert --215-- therefor

In Column 28, Line 23, delete "330." and insert --230.-- therefor

In Column 29, Line 19, delete "230" and insert --220-- therefor

In Column 29, Line 20, delete "230" and insert --220-- therefor

In Column 29, Line 40, delete "320" and insert --220-- therefor

In Column 29, Line 46, delete "320" and insert --220-- therefor

In Column 29, Line 50, delete "320." and insert --220.-- therefor

In Column 29, Line 52, delete "320," and insert --220,-- therefor

In Column 31, Line 58, delete "101" and insert --501-- therefor

In Column 34, Line 43, delete "Appcelerator," and insert --Appcelerator®,-- therefor Signed and Sealed this
Fifth Day of November, 2024

Katherine Kelly Vidal
*Director of the United States Patent and Trademark Office*